United States Patent
Yi et al.

(10) Patent No.: US 10,880,032 B2
(45) Date of Patent: Dec. 29, 2020

(54) METHOD FOR RECEIVING SIGNALS AND WIRELESS DEVICE THEREOF

(71) Applicant: LG Electronics Inc., Seoul (KR)

(72) Inventors: Yunjung Yi, Seoul (KR); Kijun Kim, Seoul (KR); Eunsun Kim, Seoul (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,863

(22) PCT Filed: Jun. 12, 2017

(86) PCT No.: PCT/KR2017/006090
§ 371 (c)(1),
(2) Date: Jun. 21, 2018

(87) PCT Pub. No.: WO2017/217719
PCT Pub. Date: Dec. 21, 2017

(65) Prior Publication Data
US 2019/0103931 A1    Apr. 4, 2019

Related U.S. Application Data

(60) Provisional application No. 62/349,074, filed on Jun. 12, 2016, provisional application No. 62/367,112, (Continued)

(51) Int. Cl.
*H04J 11/00* (2006.01)
*H04B 7/06* (2006.01)
(Continued)

(52) U.S. Cl.
CPC ........ *H04J 11/0076* (2013.01); *H04B 7/0639* (2013.01); *H04B 7/2656* (2013.01);
(Continued)

(58) Field of Classification Search
CPC .............. H04J 11/0076; H04J 11/0086; H04L 27/2607; H04L 5/001; H04L 5/0048;
(Continued)

(56) References Cited

U.S. PATENT DOCUMENTS

2012/0015653 A1* 1/2012 Paliwal ................. H04W 24/10
455/435.1
2015/0016239 A1* 1/2015 Yi ......................... H04L 5/0048
370/201
(Continued)

FOREIGN PATENT DOCUMENTS

WO    WO2016072765 A1    5/2016
WO    WO-2017026126 A1 *  2/2017  .......... H04W 72/042

OTHER PUBLICATIONS

Huawei, HiSilicon, WF on NR forward compatibility, 3GPP TSG RAN WG1 #85, Nanjing, China, May 23-28, 2016, R1-165628 (Year: 2016).*
(Continued)

*Primary Examiner* — Shailendra Kumar
(74) *Attorney, Agent, or Firm* — Fish & Richardson P.C.

(57) ABSTRACT

The disclosure of the present invention proposes a method for receiving signals. The method may be performed by a wireless device and comprise: receiving synchronization signals (SSs) from a serving cell and from a neighbor cell; and receiving radio resource management reference signals (RRM-RSs) from the serving cell and from the neighbor cell.

20 Claims, 20 Drawing Sheets

Related U.S. Application Data filed on Jul. 27, 2016, provisional application No. 62/381,539, filed on Aug. 30, 2016.

(51) Int. Cl.
| | | |
|---|---|---|
| *H04B 7/26* | (2006.01) | |
| *H04W 56/00* | (2009.01) | |
| *H04L 5/00* | (2006.01) | |
| *H04L 27/26* | (2006.01) | |

(52) U.S. Cl.
CPC .......... *H04J 11/0086* (2013.01); *H04L 5/001* (2013.01); *H04L 27/2607* (2013.01); *H04W 56/00* (2013.01); *H04W 56/0015* (2013.01); *H04L 5/0048* (2013.01)

(58) Field of Classification Search
CPC ............... H04B 7/0639; H04B 7/2656; H04W 56/0015; H04W 56/00
See application file for complete search history.

(56) References Cited

U.S. PATENT DOCUMENTS

| | | | | |
|---|---|---|---|---|
| 2016/0006549 | A1* | 1/2016 | Kim | H04B 17/318 |
| | | | | 370/252 |
| 2017/0164211 | A1* | 6/2017 | Ho | H04L 5/0048 |
| 2017/0318490 | A1* | 11/2017 | Yang | H04L 5/0048 |
| 2017/0331577 | A1* | 11/2017 | Parkvall | H04L 5/1469 |
| 2018/0084432 | A1* | 3/2018 | Kwak | H04L 27/26 |
| 2018/0255523 | A1* | 9/2018 | Liu | H04L 5/0092 |

OTHER PUBLICATIONS

Samsung, Numerology and frame structure for 5G new radio interface: over-6GHz, 3GPP TSG RAN WG1 Meeting #84bis, Busan, Korea, Apr. 11-15, 2016, R1-162180 (Year: 2016).*

Samsung, Framework for beamformed access, 3GPP TSG RAN WG1 #85, Nanjing, China, May 23-27, 2016, R1-164013 (Year: 2016).*

LG Electronics, et al., "WF on Supporting different Numerologies in a NR carrier," 3GPP TSG RAN WG1 Meeting #85, R1-166008, May 27, 2016, 6 pages.

NTT Docomo, Inc., "WF on NR numerology," 3GPP TSG RAN WG1 meeting #84bis, R1-163605, Apr. 11-15, 2016, 5 pages.

Huawei, HiSilicon, "WF on NR forward compatibility," R1-165628, 3GPP TSG RAN WG1 #85, Nanjing, China, May 23-28, 2016, 3 pages.

Alcatel-Lucent, Alcatel-Lucent Shanghai Bell, "Extension carriers and carrier segments in LTE-A," R1-100407, 3GPP TSG-RAN WG1 #59bis, Valencia, Spain, Jan. 18-22, 2010, 3 pages.

Samsung, "Framework for beamformed access," R1-164013, 3GPP TSG RAN WG1 #85, Nanjing, China; May 23-27, 2016, 4 pages.

Huawei, HiSilicon, "Overview of 5G frame structure," R1-162157, 3GPP TSG RAN WG1 Meeting #84bis, Busan, Korea, Apr. 11-15, 2016, 6 pages.

Korean Office Action in Korean Appln. No. 10-2019-7016305, dated Oct. 16, 2020, 10 pages. (with English translation).

LG Electronics, Huawei, HiSilicon, Panasonic, "WF on Supporting different Numerologies in a NR carrier," R1-165837, 3GPP TSG RAN WG1 Meeting #85, Nanjing, China, May 23-27, 2016, 3 pages.

Nokia, Alcatel-Lucent Shanghai Bell, "Support for Beam Based Common Control Plane," R1-165364, 3GPP TSG-RAN WG1#85, Nanjing, P.R. China, May 23-27, 2016, 5 pages.

* cited by examiner

FIG. 4
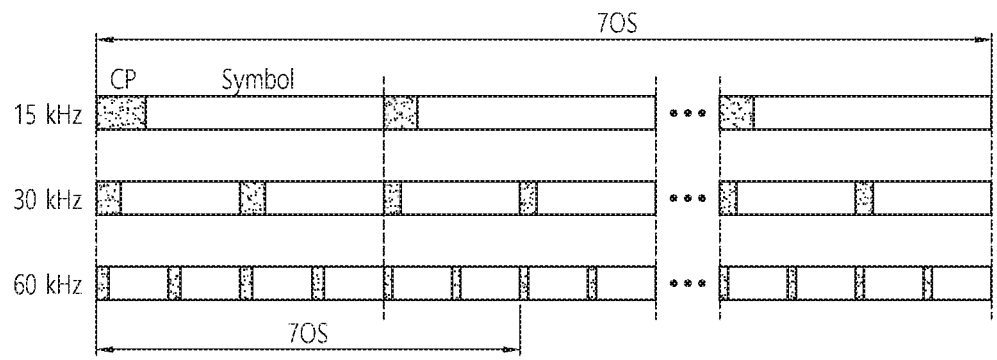
(a) Symbol level alignment option 1
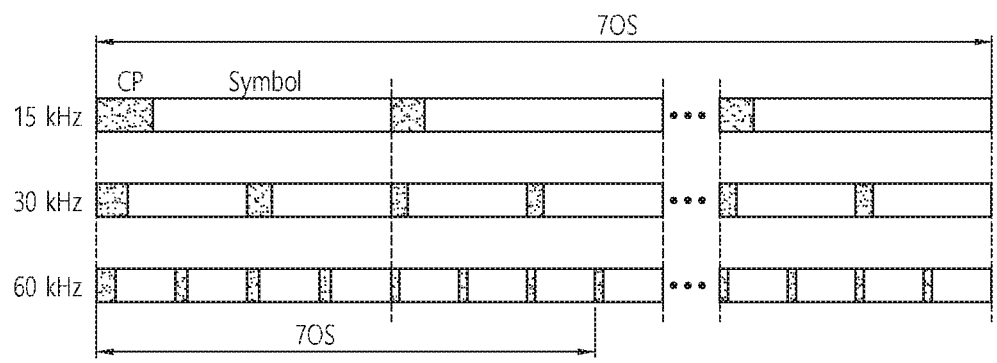
(b) Symbol level alignment option 2
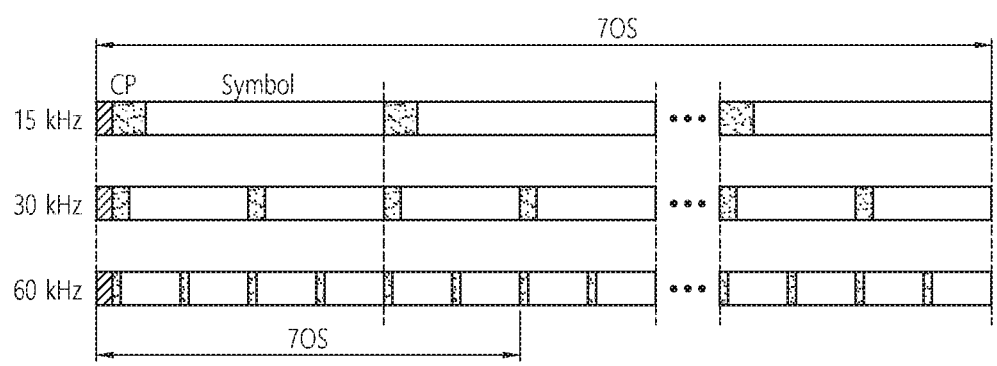
(c) Symbol level alignment option 2-1

(a) Slot/subframe level alignment

METHOD FOR RECEIVING SIGNALS AND WIRELESS DEVICE THEREOF

CROSS-REFERENCE TO RELATED APPLICATIONS

This application is a National Stage application under 35 U.S.C. § 371 of International Application No. PCT/KR2017/006090, filed on Jun. 12, 2017, which claims the benefit of U.S. Provisional Application No. 62/381,539, filed on Aug. 30, 2016, U.S. Provisional Application No. 62/367,112, filed on Jul. 27, 2016, and U.S. Provisional Application No. 62/349,074, filed on Jun. 12, 2016. The disclosures of the prior applications are incorporated by reference in their entirety.

BACKGROUND OF THE INVENTION

Field of the Invention

The present invention relates to mobile communication.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (RAT) for convenience. The new RAT may be also abbreviated to a NR.

For operating NR efficiently, various schemes have to be adopted. However, until now, efficient scheme has not been introduced.

SUMMARY OF THE INVENTION

Accordingly, the disclosure of the specification has been made in an effort to solve the problem.

To achieve the foregoing purposes, the disclosure of the present invention proposes a method for receiving signals. The method may be performed by a wireless device and comprise: receiving synchronization signals (SSs) from a serving cell and from a neighbor cell; and receiving radio resource management reference signals (RRM-RSs) from the serving cell and from the neighbor cell. The RRM-RSs may include a first RRM-RS and a second RRM-RS. The first RRM-RS may include a secondary synchronization signal (SSS). The second RRM-RS may include a channel state information reference signal (CSI-RS). The SSS may be used for RRM RSs for neighbor cell measurements. The CSI-RS can be used at least for serving cell measurements. The RRM-RSs from the serving cell may be used to select a best beam of the serving cell. The RRM-RSs from the neighbor cell may be used for long-term measurement.

The RRM-RSs from the neighbor cell may be aligned with the SS from the neighbor cell.

The SS may be received in a synchronization signal (SS) block. The SS may include a primary synchronization signal (PSS) and a secondary synchronization signal (SSS). The SS block may include the PSS, SSS, a physical broadcast channel (PBCH). Additional RRM RS may be transmitted in the same OFDM symbol with SS block where RRM RS may not be mapped to resources of SS block.

The SS block may be included in a minimum system bandwidth. The minimum system bandwidth may be located in anywhere in an entire system bandwidth of each cell.

A plurality of resource blocks (RBs) in the SS block may be indexed regardless of an entire system bandwidth.

To achieve the foregoing purposes, the disclosure of the present invention proposes a method for receiving signals. The method may be performed by a wireless device and comprise: receiving a synchronization signal (SS) from a cell. The wireless device is configured to use different numerologies. The numerologies may be defined by a sub-carrier spacing and a cyclic prefix (CP) length. Here, if different CP lengths are used in different orthogonal frequency division multiplexing (OFDM) symbols, at least one of a secondary synchronization signal (SSS) and a physical broadcast channel (PBCH) may be not placed in a subframe which has a larger CP based OFDM symbol.

To achieve the foregoing purposes, the disclosure of the present invention proposes a wireless device for receiving signals. The wireless device may comprise: a transceiver; and A processor configured to control the transceiver thereby performing: receiving synchronization signals (SSs) from a serving cell and from a neighbor cell; and receiving radio resource management reference signals (RRM-RSs) from the serving cell and from the neighbor cell, respectively. The RRM-RSs may include a first RRM-RS and a second RRM-RS. The first RRM-RS may include a secondary synchronization signal (SSS). The second RRM-RS may be used to select a best beam of the serving cell.

According to the disclosure of the present specification, the problems of the above-described prior art are solved.

BRIEF DESCRIPTION OF THE DRAWINGS

FIG. 4 shows examples of symbol level alignment.

DESCRIPTION OF EXEMPLARY EMBODIMENTS

Figure 1:
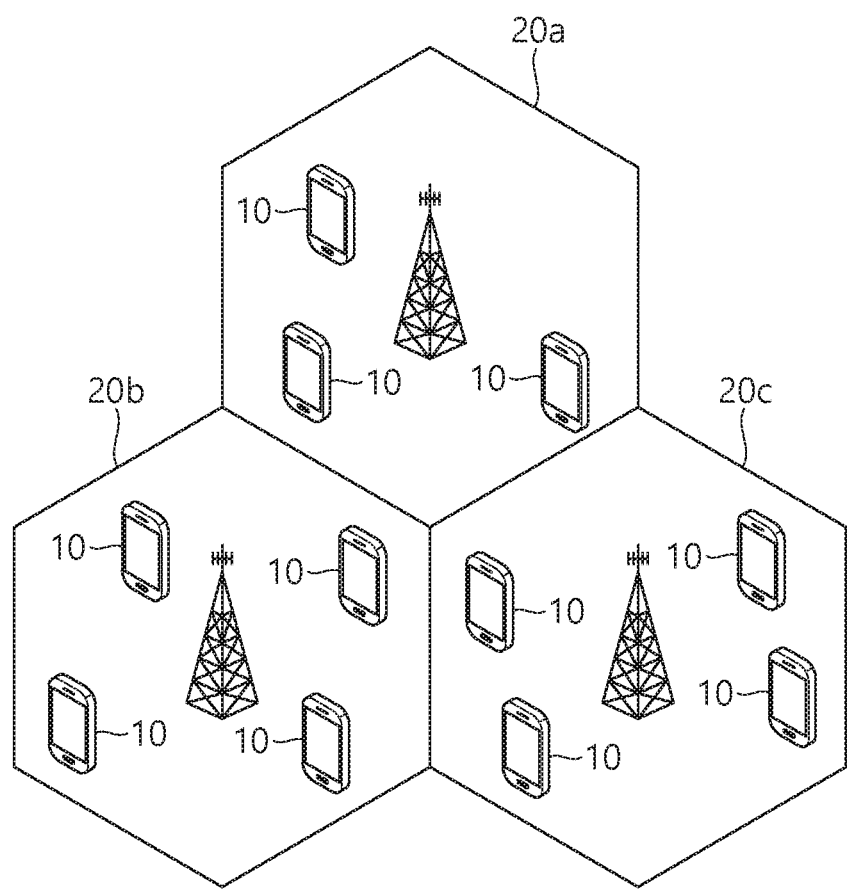
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Figure 2:
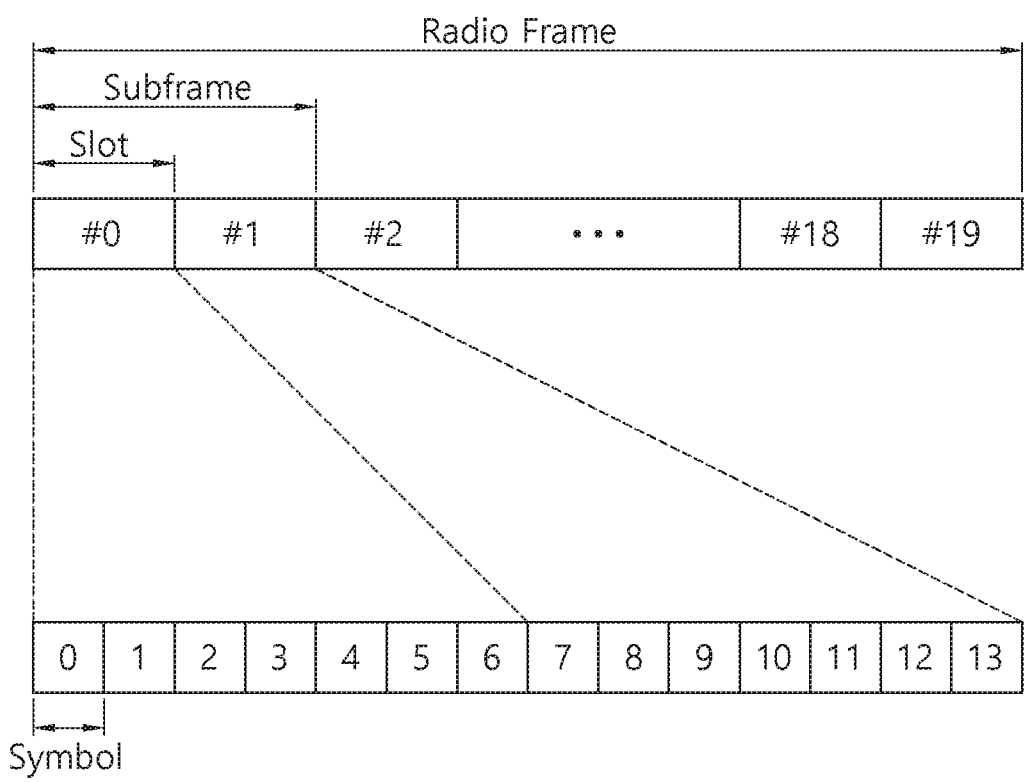
FIG. 2 shows a downlink radio frame structure according to FDD of 3rd generation partnership project (3GPP) long term evolution (LTE).

FIG. 2 Shows a Downlink Radio Frame Structure According to FDD of 3rd Generation Partnership Project (3GPP) Long Term Evolution (LTE).

The radio frame includes 10 subframes indexed 0 to 9. One subframe includes two consecutive slots. Accordingly, the radio frame includes 20 slots. The time taken for one subframe to be transmitted is called a transmission time interval (TTI). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

As such, one subframe is called as a transmission-time-interval (TTI). TTI refers to the duration of a transmission. So, the base station schedule the radio resource in unit of the TTI, e.g., subframe.

<Carrier Aggregation>

Hereinafter, a carrier aggregation (CA) system will be described.

The CA system refers to aggregate a plurality of component carriers (CCs). Due to CA, the meaning of a legacy cell has been changed. According to CA, a cell may refer to a combination of a downlink (DL) CC and an uplink (UL) CC or a single DL CC.

Also, in CA, a cell may be classified as a primary cell, a secondary cell, and a serving cell. The primary cell refers to a cell operating in a primary frequency and refers to a cell in which a UE performs an initial connection establishment procedure or a connection re-establishment procedure with a BS (or an eNB) or a cell indicated as a primary cell during a handover procedure. The secondary cell refers to a cell operating in a secondary frequency, which is configured once RRC connection is established and which is used to provide additional wireless resource.

As mentioned above, in the CC system, a plurality of CCs, i.e., a plurality of serving cells, may be supported, unlike a single carrier system.

Such carrier aggregation system may support cross-carrier scheduling. The cross-carrier scheduling is a scheduling scheme that may conduct resource allocation of a physical uplink shared channel (PUSCH) transmitted through other component carriers than the component carrier basically linked to a specific component carrier and/or resource allocation of a physical downlink shared channel (PDSCH) transmitted through other component carriers through a physical downlink control channel (PDCCH) transmitted through the specific component carrier.

<Next Generation Mobile Network>

5th generation mobile networks or 5th generation wireless systems, abbreviated 5G, are the proposed next telecommunications standards beyond the current 4G LTE/international mobile telecommunications (IMT)-dvanced standards. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things. Hereinafter, 5G technology may be referred to as new radio access technology (NR).

In NR, utilizing a subframe in which downlink and uplink are contained may be considered. This scheme may be applied for paired spectrum and unpaired spectrum. The paired spectrum means that one carrier consists of two parts of spectrum for downlink and uplink operation. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further in new RAT, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

Figure 3:
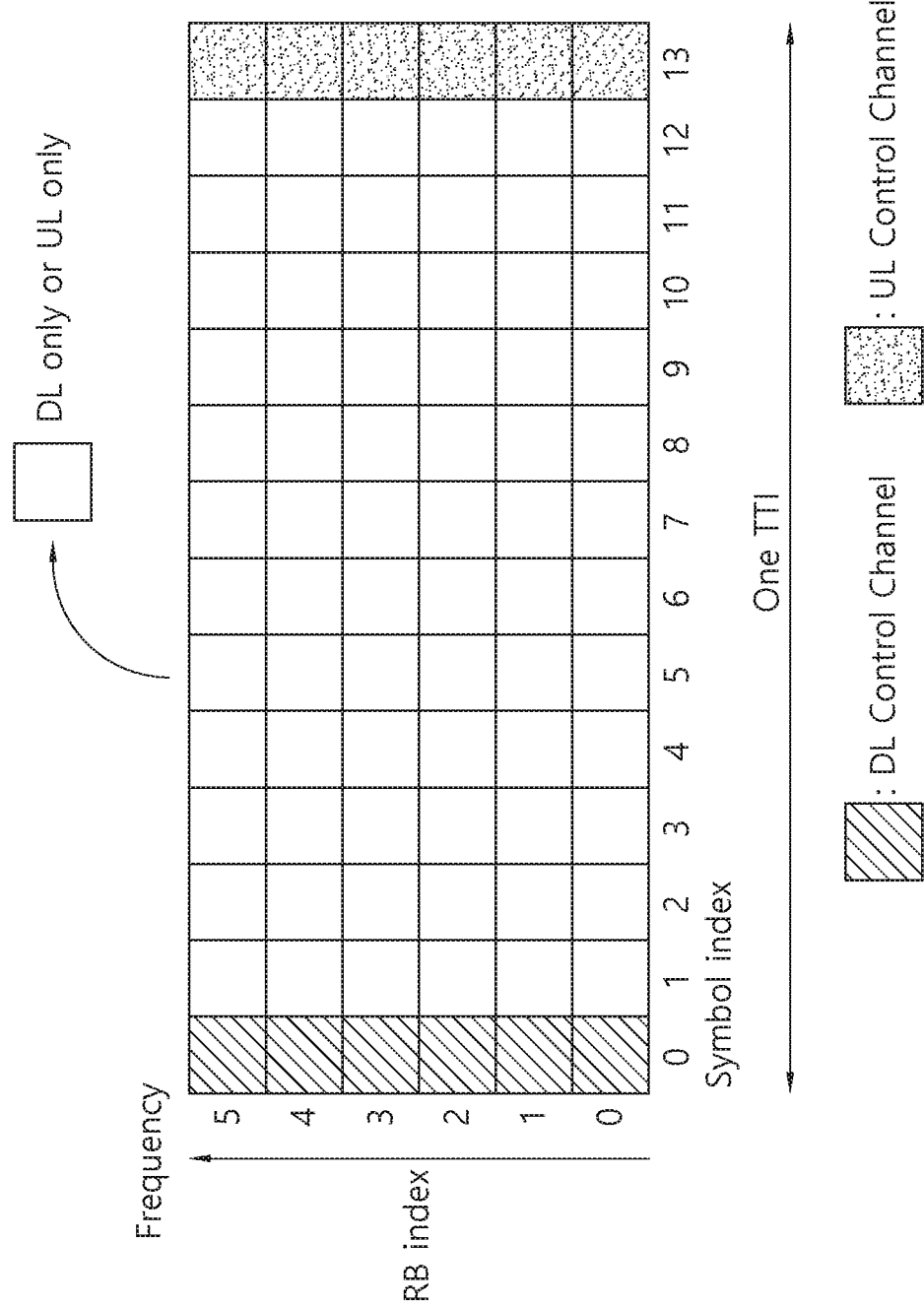
FIG. 3 shows an example of subframe type for new RAT.

FIG. 3 Shows an Example of Subframe or Slot for New RAT.

As shown in FIG. 3, the one TTI is called as a subframe or slot for new RAT. The subframe or slot shown in FIG. 3 may be used in TDD system of new RAT, in order to minimize latency of data transmission. Referring to FIG. 3, the subframe (or slot) contains 14 symbols in one TTI, like the current subframe. However, the subframe (or slot) includes DL control channel in the first symbol, and UL control channel in the last symbol. The remaining symbols may be used for DL data transmission or for UL data transmission. According to this subframe (or slot) structure, DL transmission and UL transmission may sequentially proceed in one subframe (or slot). Accordingly, DL data may be transmitted in the subframe (or slot), and UL acknowledgement/non-acknowledgement (ACK/NACK) may also be received in the subframe (or slot). In this manner, the subframe (or slot) shown in FIG. 3 may be referred to as self-contained subframe. As a result, it may take less time to retransmit data when a data transmission error occurs, thereby minimizing the latency of final data transmission. In the self-contained subframe (or slot) structure, a time gap may be required for the transition process from the transmission mode to the reception mode or from the reception mode to the transmission mode. For this purpose, some OFDM symbols at the time of switching from DL to UL in the subframe (or slot) structure may be set to the guard period (GP).

Figure 5:
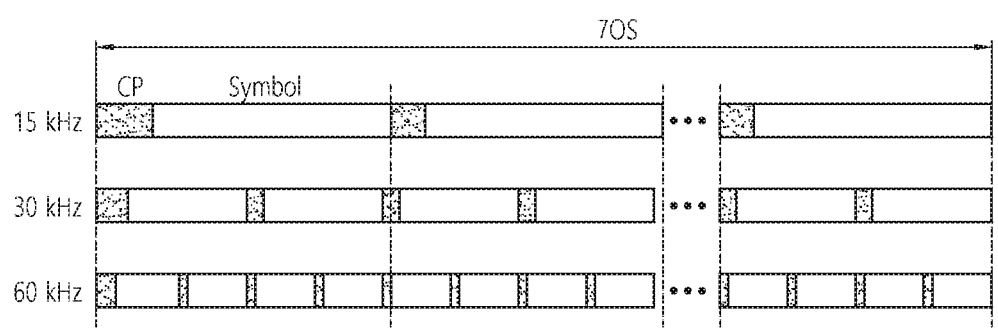
FIG. 5 shows an example of slot/subframe level alignment.

FIG. 4 Shows Examples of Symbol Level Alignment and FIG. 5 Shows an Example of Slot/Subframe Level Alignment.

For normal CP family, choose one option from the followings for symbol-level alignment.

For $F_s=F_0*2^n$ (n is a positive integer, $F_0$=15 kHz).

Each symbol length (including CP) of $F_0$ equals the sum of the corresponding $2^n$ symbols of $F_s$.

Option 1: The first $2^n$ symbols of $F_s$ have equal symbol length

Option 2: Except for the first symbol of $F_s$, all symbols of $F_s$ have equal symbol length. The length of first symbol of $F_s$ is sum of length of the second symbol and 0.51 us Option 2-1. 0.51 us can be reserved, and all symbols have the equal length A carrier is defined with "reference numerology set" which can be used for synchronization purpose at least.

Reference numerology may be fixed as 15 kHz with different CP overhead, or 15 kHz NCP or configured by synchronization signal or configured by higher layer or determined by the smallest subcarrier spacing supported by the carrier or by the spec or largest subcarrier spacing supported by the carrier or by the spec.

In next generation network, it is expected that various usage scenarios requiring different latency and reliability KPIs are supported in the same frequency region potentially by the same cell. Furthermore, to allow growing vertical industry and potentials needs (yet unknown) in the future, frame structure should be able to support very flexible resource utilizations. One of flexible resource utilization aspects includes supporting various set of CP overhead compared to OFDM symbol size. Some requirements can be listed as follows.

Resource unit (e.g., subframe) can include variable number of mini resource units. It is expected that different latency requiring usage scenarios would be multiplexed, thus, ability to allow different resource unit sizes seems necessary. When mini resource unit is also used, basic functions to generate channels can be based on min-resource unit rather than resource unit. Basic function includes functionalities such as control/data scrambling, contain RS, scheduling, etc. This can be also used for inter-cell interference coordination. The mini-resource unit or resource unit size can be different per UE or usage scenario or per subband/narrowband.

From a UE perspective, scheduling unit or resource block used in "one" transmission can vary depending on latency requirement and packet size, etc. Also, the timing relationship among channels (such as PDSCH and corresponding A/N, UL grant to PUSCH, SPS configuration periodicity, etc) can be different per UE/usage scenario/subband.

From a UE perspective, mechanism to maximize spectral efficiency for example by reducing CP or GP is supported. One of extreme mechanism is to transmit "multiple set of (CP size, OFDM symbol size)" where a UE can select the best pair based on the measurement, and report it back to the network such that the selected pair can be used for the given UEs. For example, under 6 GHz frequency, there could be {NCP, 15 kHz}, {ECP, 30 kHz}, {NCP, 30 kHz}, {NCP, 60 kHz} possibilities which can be sent via measurement RS or signals such that a UE can measure the performance and report the best pair. This may be done also via initial access procedure (e.g., RAR or Msg 4 is sent with multiple combinations and the UE selects the best pair based on received RAR or Msg 4 quality). In terms of GP, it is much easier that the network may assume "no GP" for a given UE initially, and set "GP" based on UE capability or requesting GP length. The UE can ask "margin" in addition to timing advance on GP requirement which may be necessary for transient period or DL/UL switching. As timing advance can be also increased, GP length can be dynamically adjusted which can be done via higher layer siganling or changed autonomously with timing advance.

Network should be able to "blank" partial or full resource unit in both time and frequency domain For example, very short and infrequent message interruption may be necessary to convey emergency messages or extremely urgent message delivery.

The proposed "special" OFDM symbol in this invention can be also used for "blank" resource for future proof Thus, basic mechanism of assuming that one resource unit defined in a time duration can be always usable by the network either to downlink or uplink may not work. It should be supported to provide reserved partial resources which may not be used for some UE's downlink/uplink even in one resource unit.

Furthermore, different UEs are multiplexed where different UEs may require different CP length due to its environments.

Based on the above observations, this invention proposes "flexible" resource unit definition which allows Different number of OFDM symbols in a resource unit Effective OFDM symbols usable for downlink or uplink or sidelink may be restricted Various pattern of special resource or reserved resource can be configurable Note that "special resource" referred here means that the resource may not be used for regular TTI definition, rather it can be used for some other purposes such as control and/or pilot RS transmission.

Different size of resource unit can change over time and frequency, and different size of resource units can be multiplexed in FDM and TDM manner from the network operation perspective. If the network and/or UE can support, overlapping between resource units of different sizes can be also supported.

For a convenience, there is two aspects to define resource units in frequency domain and time domain. From frequency domain, we can call a set of contiguous subcarriers which utilizing the same numerology as "frequency resource group" (FRG), and from time-domain we can call a set of "OFDM symbols" which utilizing the same numerology as "time resource group". A numerology resource unit is defined as a set of FRG and TRG with a numerology set {subcarrier spacing, CP duration(s)}. This invention mainly discusses "TRG" construction, which can be applied to a NRG. FRG can be contiguous or non-contiguous. In case contiguous, there could be multiple FRGs sharing the same numerology in a carrier. In case non-contiguous, only one FRG in a NR carrier uses the same numerology.

In case TRG is defined, there could be multiple of TRGs possible where the same numerology is assumed to be used. Let's call this as "G-TRG" (group-TRG).

G-TRG can be larger than 1msec or subframe length of a given numerology or a reference numerology set. In any case, from a UE perspective on a given usage scenario, for a given NRG, the UE may assume that the same numerology is used in the NRG unit. This can be also used for inter-cell interference coordination, for example, one a given frequency chunk, the network may change its numerology at subframe or a time scale of G-TRG which can be either prefixed or configured (which can be also coordinated among inter cells). One example is to allow coordination with LTE numerology where at least the same numerology is used within 1 msec or the numerology may change at time-scale of "T" (where G-TRG size is T) to avoid unnecessarily fluctuating interference. In other words, this time and frequency units can be negotiated/coordinated among neighbour cells such that each cell can manage its own scheduling/handling of interference accordingly. If there are multiple NRGs, it is also possible that multiple signalling of time and frequency granularity with numerology set can be coordinated.

From a UE cancellation perspective, it can be also known to the UE that the duration where one numerology can be maintained in a time T (G-TRG) regardless of whether the service is intended for the UE or not.

During the time, a UE can assume the signals would be generated based on the configured numerology. It is however noted that this can be only used as "baseline" signalling where some other numerology based generated signals can puncture the baseline signals. One example is that a network may configure a frequency range with 15 kHz and normal CP for a radio frame unit, and then 30 kHz URLLC traffic may puncture occasionally the baseline 15 kHz signals.

This G-TRG unit can be also used for signalling purpose where a UE may be configured dynamically with a numerology set which will be used in the next G-TRG/FRG. In time and/or frequency RG indication can be possible.

So, at least from ICIC perspective or UE cancellation perspective, basic unit to retain the same numerology can be necessary in addition to the frequency information.

It is also however possible that multiple levels of G-TRGs can be defined with the same numerology set in the same frequency region or FRG such that one may be semi-statically configured, which can be dynamically overridden by dynamic change. For example, semi-statically, G-TRG can be configured in multiple of radio-frames, which can be overridden by dynamic signalling per each subframe. One easy example of G-TRG is a radio frame where as TRG is a subframe. For UL and DL, G-TRG and TRG can be independently configured from a numerology perspective.

In general, to operate in unpaired spectrum,

Semi-static UL/DL configuration can be given per subframe

TRG in unit of subframe per DL and UL can be configured

G-TRG in unit of TRG per DL and UL can be configured

G-FRG (group of FRG) per each numerology can be configured (baseline FRG or a carrier)

Dynamic frequency region change indication used with each numerology

<Disclosures of the Invention>

In next generation network, it is expected that various usage scenarios requiring different latency and reliability KPIs are supported in the same frequency region potentially by the same cell. Furthermore, to allow growing vertical industry and potentials needs (yet unknown) in the future, frame structure should be able to support very flexible resource utilizations.

There are different applications requiring different latency, data rate and capacity requirements. Depending on applications, necessary mechanisms could be different. To support various usage scenarios with different UE capabilities, initial access procedure of new RAT should be carefully designed which can support dissimilar situations/cases.

For a convenience, let's define the following terminologies used throughout this invention.

(1) Frequency band: a chunk of contiguous frequency spectrum allocated to one operator (2) Minimum system bandwidth: supported minimum system bandwidth supported by NR, mainly for eMBB and URLLC use cases. It can be viewed as the minimum bandwidth possible for carriers where the initial access procedure in this invention can be applied.

A. In terms of minimum system bandwidth, it can have the following alternatives i. Alt1: minimum system bandwidth is restricted such as M MHz (e.g., 5 MHz) regardless of numerology. The minimum bandwidth can be different per frequency range. For example, it can be 5 MHz for below 6 GHz whereas larger such as 50 MHz can be assumed for above 6 GHz. This implies that the overall number of subcarriers usable at one time for initial access such as sync signals can be reduced unless transmission will be spanned over multiple OFDM symbols. Though the number of resource elements over the minimum system bandwidth in a given time unit is same/constant, the number of subcarriers usable at one time with this approach would be reduced with subcarrier spacing scaling.

ii. Alt 2: Minimum system bandwidth is defined as "M*k" subcarriers (e.g., M=5, k=12). With this approach, minimum system bandwidth would be linearly increased with subcarrier spacing iii. Alt3: define potentially different minimum bandwidth per subcarrier spacing. For example, the following can be one example per subcarrier spacing for minimum system bandwidth.

15 kHz-5 MHz
30 kHz-10 MHz
60 kHz-10 MHz
120, 240-20 MHz (3) Carrier: a system bandwidth which may be broadcasted by a physical broadcast channel (PBCH) or system information or via UE-specific higher layer signaling. It is assumed that bandwidth of a carrier is rather semi-static (though the actual system bandwidth or bandwidth to schedule control/data can be changed dynamically). Also for future extensibility, it is also considerable that a UE may not know exact system bandwidth.

Intended to be supported by a single cell/TRP

The actual system bandwidth can be larger or smaller than the system bandwidth indicated by PBCH. In case, system bandwidth is used for cell-specific signals such as measurement RS, system bandwidth indicated by PBCH can be "minimum system bandwidth" or "operating system bandwidth" where actual maximum system bandwidth may be indicated by additional signaling via SIB and/or RRC signaling. The maximum system bandwidth may not be indicated, where "partial" frequency region of the maximum system bandwidth can be indicated to different UEs.

(4) Maximum system bandwidth: supported maximum bandwidth by a single carrier

Depending maximum FFT size

Note that this invention discusses mainly "one beam" direction in case analog beam is used. It is noted that multiple instances of PSS/SSS/PBCH/RRM-RS ((Radio Resource Management-Reference Signal) can be possible if the network supports multiple analog beams (or multiple beams). Some details regarding analog beam or multiple beam are captured in some places. However, without explicit note, the invention mainly discusses the mechanism for "one beam" case which can be expanded to multi-beam cases without loss of generality. It is however noted that a UE can be supported by multiple beams simultaneously or based on selection (i.e., dynamic switching), also it can be noted that one beam may consist of multiple beams either in SFN manner or grouping manner.

I. Minimum System Bandwidth

Figure 6:
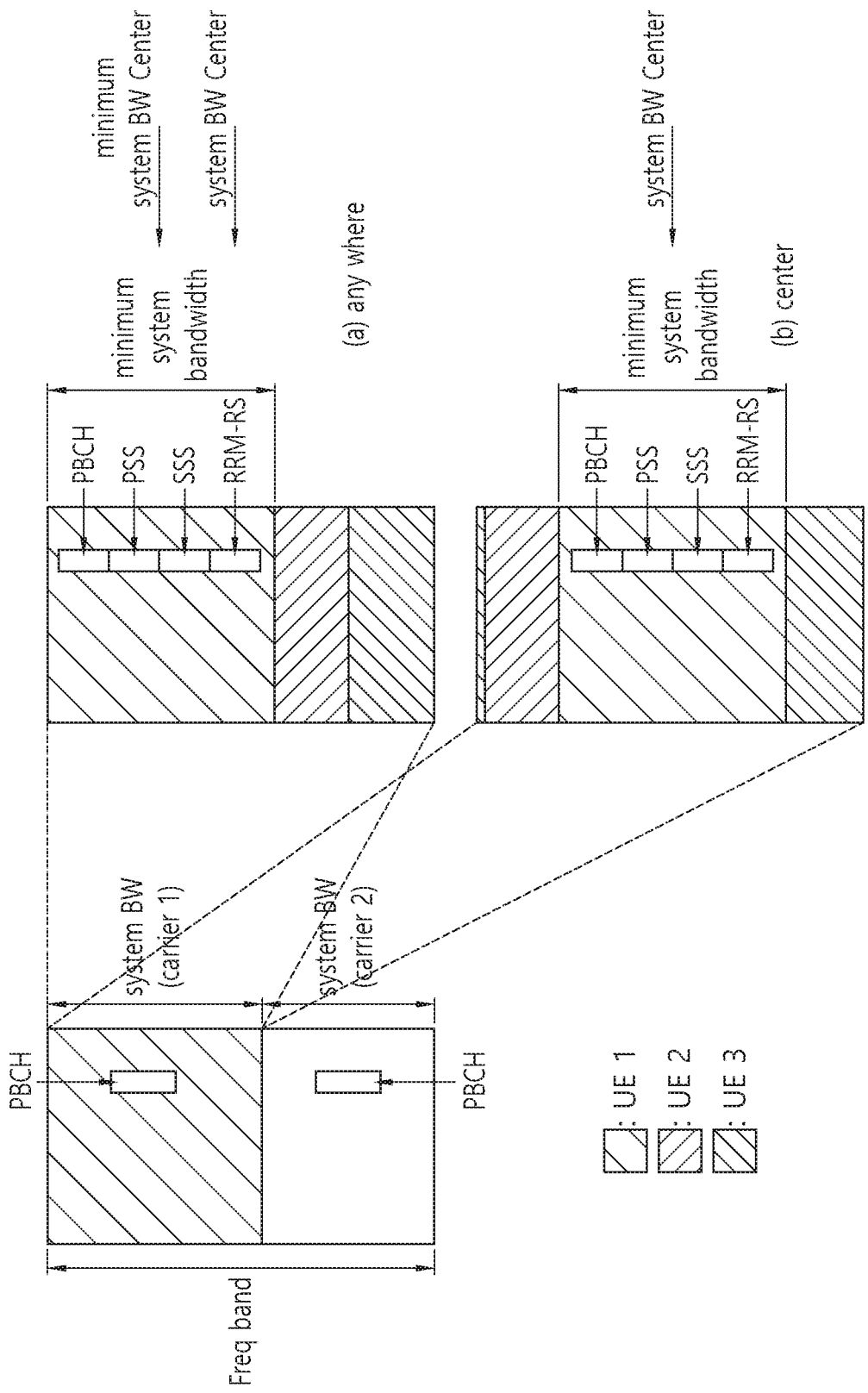
FIG. 6 shows locations of a block including synchronization signals.

Based on the assumption that minimum system bandwidth is defined, it may be assumed that essential transmission, which should be bandwidth-agonistic or would be happened when a UE is not aware of system bandwidth, can be transmitted over the minimum system bandwidth. Also, it is further assumed that different UEs with different bandwidth capabilities are supported in the network (e.g., UE1, UE2, UE3 as shown in FIG. 6) where at least each UE can support minimum system bandwidth. In this case, overall two options can be considered in terms of "frequency" location of initial synchronization signals as shown in FIG. 6.

FIG. 6 Shows Locations of a Block Including Synchronization Signals.

As shown in FIG. 6, a block including synchronization signals (e.g., primary synchronization signal (PSS), secondary synchronization signal (SSS)) and a physical broadcast channel (PBCH) may be located (a) in anywhere or (b) in a center. The block may be called as SS block.

For example, if a frequency band is operating with two carriers, then one carrier is defined with maximum system bandwidth and it is assumed that essential transmission such as synchronization signals are transmitted over minimum system bandwidth. Assuming different UE may require different numerology depending on usage scenarios or deployment scenarios, it is generally desirable to place minimum system bandwidth towards edge of the carrier or system bandwidth such that the network can place one or more subbands with different numerology in different regions. In other words, by placing minimum system bandwidth in the edge, the remaining frequency regions can be flexibly used for different numerologies from synchronization signals and/or PBCH or for some other purposes. Furthermore, in case FDM manner of DL and UL is used in unpaired spectrum, it is desirable to place the synchronization signal(s) towards the edge to maximize the gap between DL and UL portions. For a UE only supporting minimum system bandwidth may stay in the frequency region indicated by the minimum system bandwidth. Furthermore, if any frequency diversity gain is attempted, the frequency location of "minimum system bandwidth" portion can change dynamically or semi-statically which should be derived from information carried in synchronization signals or indicated to a UE via assisting cell.

If minimum system bandwidth can be placed in anywhere in a carrier, the PRB index of PBCH can be dynamically changed, and also the indication of system bandwidth should be carefully designed considering the fact that minimum system bandwidth or synchronization signals may not be transmitted in the center.

Assumption on PBCH-RS Scrambling

Let's call a system bandwidth of N MHz which consists of P RBs. Also, let's call minimum system bandwidth as "initial-subband" which contains initial-procedure necessary signals (e.g., sync and PBCH).

A. Propose that initial-subband is multiple of RBs where RBs are defined based on the numerology used for synchronization signals and/or PBCH, let's call initial-subband size is K RBs It is however noted that depending on a rule, different numerology can be used between synchronization signals and PBCH and other RRM-RS, and SIB transmissions.

B. As long as channel raster condition is satisfied, initial-subband is placed in [A, A+K−1] PRBs in the entire system bandwidth of a carrier assuming the numerology used for synchronization signals and/or PBCH. In other words, PRB alignment between initial-subband and the entire system bandwidth is assumed based on the numerology used for sync signals.

C. In this case, in terms of PBCH-RS scrambling, it is assumed that i. Alt 1: from the center of initial-subband (or from the lowest frequency of PBCH bandwidth) assuming maximum bandwidth, RS scrambling occurs similar to LTE center frequency and CRS scrambling. In case the same RS is transmitted over the larger frequency region than initial-subband, scrambling continues. For example, if the center frequency of initial-subband is f0, the scrambling index for f0−SC*i=N−i, f0+SC*i=N+i, where N is the maximum number of subcarriers supported by the maximum system bandwidth (supported by the spec), and SC is the subcarrier spacing.

ii. Alt 2: PBCH-RS scrambling or sequence is generated locally within PBCH bandwidth, where regardless of maximum system bandwidth, f0−SC*i uses index P*k−i, and f0+SC*i uses index i (where P is the number of RBs for initial-subband, and k is the number of subcarriers in a RB). If this approach is used, separate scrambling or RS sequence generation may be necessary between initial-subband and other subbands. Furthermore, if there are multiple SS blocks in a NR carrier, the same set of PBCH-RS scrambling and PRB indexing on PBCH in each SS block is assumed.

D. Assumption on RB Index for SIB1

Similar to RS scrambling mechanism, PRB index can be defined based on maximum system bandwidth or can be defined by the system bandwidth at a given time.

i) Alt 1: RB index is defined for f0−SC*i as N/k−i/k, and f0+SC*i as N/k+i/k. In other words, the RB index is defined by the maximum system bandwidth, and the center of initial-subband RB index is N/k where N is the maximum number of subcarriers defined by the maximum system bandwidth supported by the spec, and k is the number of subcarriers in a RB. If this approach is used, if there are multiple SS blocks in a NR carrier where each SS block may or may not have RMSI (and thus potentially there are multiple RMSI in the carrier), PRB indexing may be different where PRB indexing is generated based on maximum system bandwidth and center frequency of the NR carrier.

ii) Alt 2: PRB indexing is generated locally within PBCH bandwidth, where regardless of maximum system bandwidth, f0−SC*i uses index P−i/k, and f0+SC*i uses index i/k (where P is the number of RBs for initial-subband, and k is the number of subcarriers in a RB). In other words, a SS block may be indexed based on an index of an initial subband. If this approach is used, if there are multiple SS blocks in a NR carrier where each SS block may or may not have RMSI (and thus potentially there are multiple RMSI in the carrier), PRB indexing of each RMSI can be same where PRB indexing can occur locally within RMSI bandwidth.

It is noted that maximum system bandwidth here refers "maximum number of RBs" instead of absolute frequency bandwidth.

The following captures two different approaches for RB index. In case initial-subband is placed in the lowest frequency region of a carrier, even with Alt2, RB index can be contiguous between initial-subband and the system bandwidth.

So far, it has been assumed that initial-subband can be placed in anywhere or in the center of a carrier. Next question is whether synchronization signal(s) are placed in the center of initial-subband or whether synchronization signal frequency location within an initial-subband can be flexible.

Figure 7:
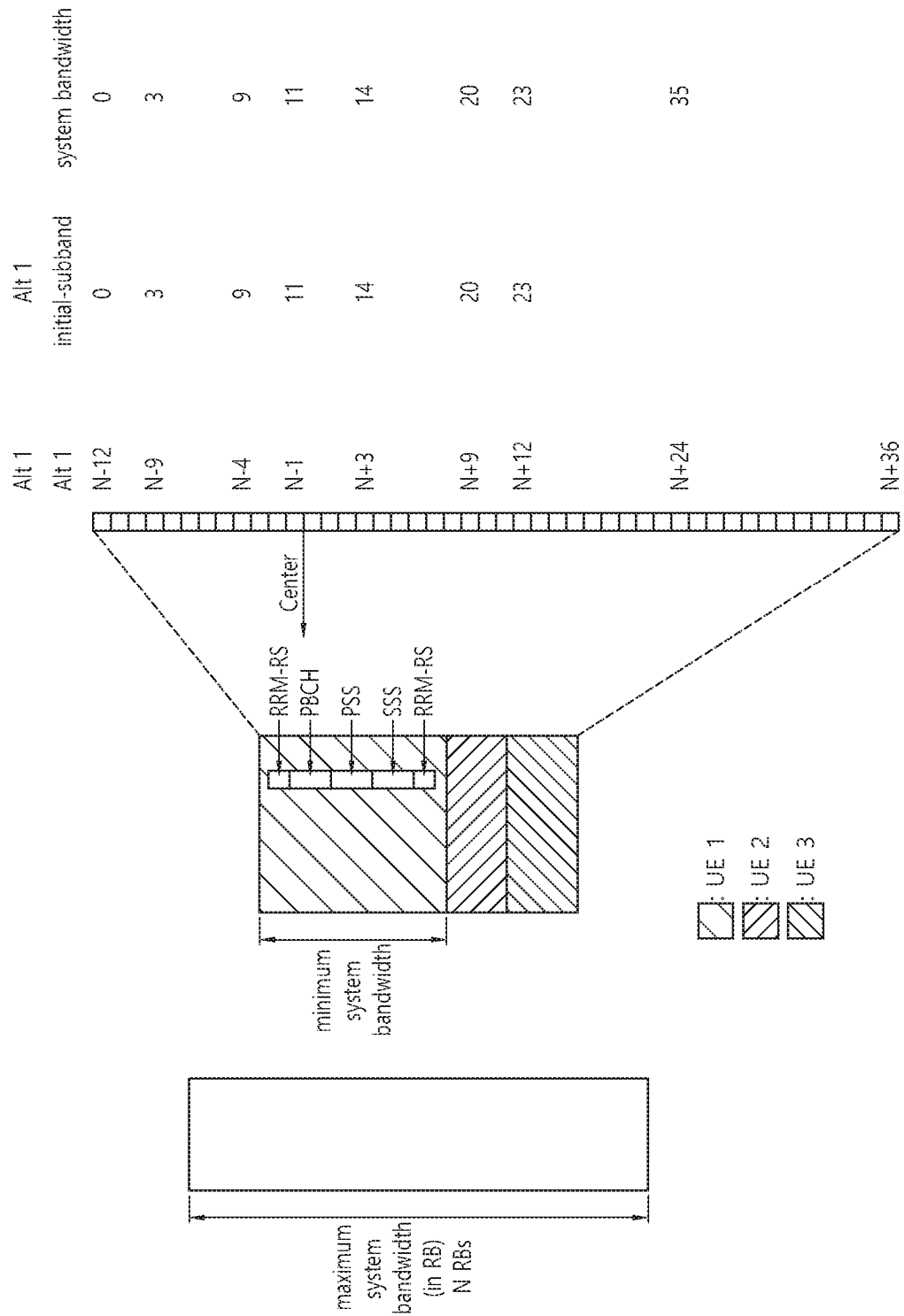
FIG. 7 shows an example that a block including synchronization signals is located in a center.

FIG. 7 Shows an Example that a Block Including Synchronization Signals is Located in a Center.

Assuming there are two synchronization signals namely primary synchronization signal and secondary synchronization signal and two signals are transmitted rather in the same OFDM symbol via FDM manner, different approaches can be considered.

(1) PSS may not be placed in the center of initial-subband: this approach allows "flexible" deployment of PSS aligned with channel raster. It is however assumed that SSS frequency location from PSS is fixed to one or at most a few candidate frequency (and potentially time) locations. Candidate location can include "next" to PSS (upper or below from PSS). The location of PBCH may be indicated by SSS or fixed to one or a few candidate locations from PSS/SSS. In terms of RRM-RS, it may be transmitted in a fixed location regardless of PSS/SSS frequency location or associated with PSS/SSS location. It is noted that PBCH may or may not present when synchronization signals are transmitted. In case PBCH is not transmitted, the resource may be used by other purposes for example RRM-RS. More specifically, RRM-RS transmitted with PSS/SSS or SSS as RRM-RS in the same time resource is mainly for neighbor cell measurement or both RRM-RS for neighbor cell and serving cell measurement can be transmitted with PSS/SSS. For a convenience, we call $1^{st}$ tier RRM-RS and $2^{nd}$ tier RRM-RS for neighbor cell measurement and serving cell measurement, respectively. For serving cell measurement, the main purpose is to detect "best beam information" whereas for the neighbor cell measurement, the main purpose is to measure long-term RSRP. $1^{st}$ tier and $2^{nd}$ tier RRM-RS may be common or separate or may be common with different periodicity. More details are discussed in section III.

(2) Generally, for neighbor cell measurement, it is desirable to align the location of PSS/SSS and also RRM-RS. In that sense, a few candidate locations in a frequency band may be defined in a spec which can be defined by channel raster. In each candidate location, a set of SSS, PBCH and RRM-RS can be defined. It is noted that SSS can be used for RRM-RS for $1^{st}$ tier measurement.

A. For example, let's assume that channel raster is 100 kHz, and with 15 kHz subcarrier spacing numerology, to align PRB level with maximum system bandwidth is 40 MHz, it can be assumed that the following would be some candidate locations where PSS can be placed where Fc is the center frequency of maximum system bandwidth of 40 Mhz (where the granularity of PSS can be GCD (100, 180)=900 kHz).
  i. Fc+900*i kHz
  ii. Fc−900*i kHz
  Where i={0, 1, . . . , 22}
  In case the initial-subband is located in the lowest RB of the system bandwidth with assuming 2 MHz as a guardband in each edge of system bandwidth, it is desirable to place PSS in the lowest RB aligned with channel raster, and place SSS/PBCH in next RBs
  The location among different channel would be RRM-RS-PSS-SSS-PBCH-RRM-RS
  The opposite mapping can be applied if initial-subband is located in the highest RB of the system bandwidth
  In case initial-subband is located in the center, the mapping can be RRM-RS-SSS-PSS-PBCH-RS
  Assuming PBCH-RS can indicate the location of RRM-RS, the mapping or frequency location between PSS/SSS can be either PSS-SSS or SSS-PSS.
  The information may be used for other purposes such as to indicate whether initial subband is located in the lowest part of RB of system bandwidth or carrier or highest part of RB of system bandwidth or carrier.

(3) PSS is always center of initial-subband or fixed location within an initial-subband. It is generally desirable to fix the location of PSS within an initial subband and fix the relative location of other channels as well to minimize UE complexity. By doing this, the candidate location where initial-subband can be placed would be further restricted where the candidate locations of initial-subband may not be overlapped each other as the follows. Note that this is to align initial-subband among neighbor cells, and thus the candidate locations may be exchanged via backhaul interface which are known to UEs in advance to minimize cell-search time.

Mechanisms of the location of synchronization signal in frequency/time domain, the approach can be different depending on whether the carrier is operating in stand-alone or non-stand-alone. In stand-alone mode operation, it may be assumed that synchronization signal at least PSS is located in the center of system bandwidth or known bandwidth, and the location can be flexible in non-stand-alone mode operation. In other words, unless there is otherwise known information, a UE may assume a certain relationship on PSS location with system bandwidth, and the information dynamically or explicitly indicated (or implicitly from synchronization signals) can override the default value.

Figure 8:
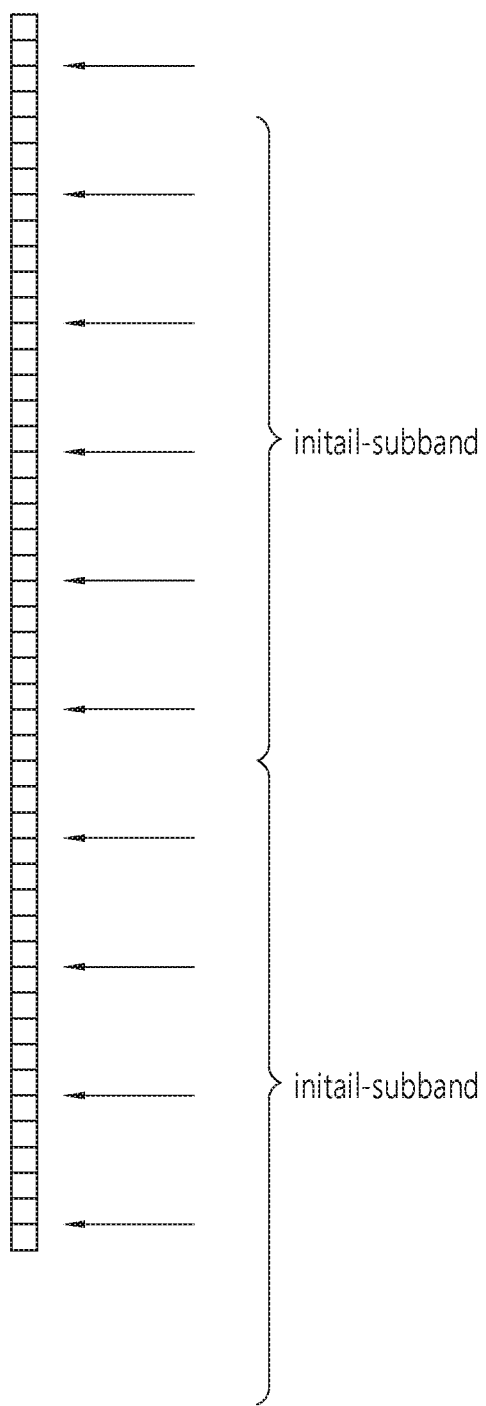
FIG. 8 shows an exemplary relationship of synchronization signal and an initial-subband.

FIG. 8 Shows an Exemplary Relationship of Synchronization Signal and Aninitial-Subband.

Now, when initial-subband is used for synchronization signal transmission, the subcarrier spacing and CP length used by synchronization signals can be determined accordingly based on the deployment scenarios. One mechanism to convey information is to switch the time/frequency location between SSS and PBCH (i.e., relative position of SSS from PSS and relative position of PBCH from PSS). Depending on the numerology used for PSS, initial-subband size can be also different in terms of actual number of RBs or bandwidth depending on the options for minimum bandwidth.

II. Multiplexing Different Numerologies

Figure 9:
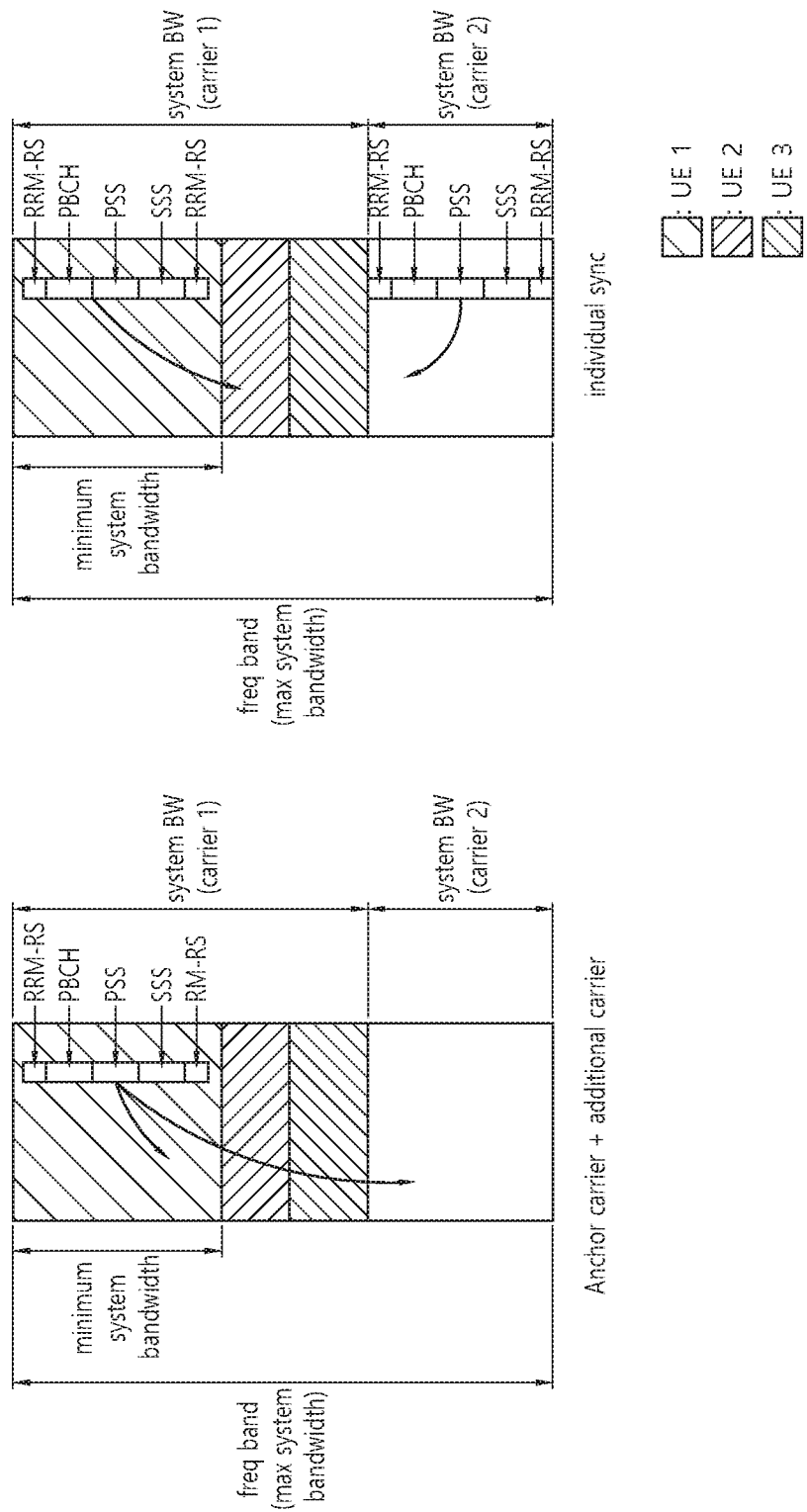
FIG. 9 shows an example of Multiplexing different numerologies.

FIG. 9 Shows an Example of Multiplexing Different Numerologies (1) As shown in FIG. 9, Anchor carrier+additional carrier (within a maximum system bandwidth, only one synchronization signal pair is transmitted)

A. To minimize synchronization signal OH, only one synchronization signal pair is transmitted within a contiguous frequency chunk in a frequency band.

B. Once a UE acquires synchronization signals (and thus perform coarse time/frequency synchronization), it may read "master-PBCH" which then can schedule "secondary-PBCH" which can be specific per carrier or per subband. Secondary-PBCH can be omitted if it can be scheduled via UE-specific higher layer signaling.
  i. Master-PBCH mainly indicates the information about subband or carrier formation if necessary C. This concept can be seen as "anchor" carrier and additional carrier where a UE searches the cell via anchor carrier, and can be retoured to additional carrier.

D. In anchor carrier, it may be also possible to receive essential system information E. More generally, for a carrier, anchor carrier where a UE can receive synchronization signals can be also configured or indicated by some means.

F. In different carrier, different numerology can be used, where additional synchronization signals can be also transmitted in additional carrier.
  i. In case rerouting to additional carrier, the configuration of numerology is also necessary if this approach is used.

(2) As shown in FIG. 9, Individual sync per each carrier
  i. Each carrier may consist of different numerology
  ii. Each carrier contains independent sync signals
  Note that multiplexing of different numerology within a carrier has not been addressed. The carrier mentioned in this invention is mainly covering the case of semi-static partitioning of frequency chunk for carriers, and discuss how to support different carriers with different numerologies. It is further noted that multiple subband with different numerology may be placed within a carrier where the location of subband can change dynamically. In this case, it needs to be clarified that how initial access signals are transmitted.

II-1. Multiplexing Different Numerology within a Carrier:

Simplest approach to support different numerologies within a carrier is to use "a default numerology" for initial access procedure, and may operate UE-specific or service specific transmissions with different numerology from the default numerology (similar to MBMS and LTE normal transmission multiplexing). In this invention, different case is discussed.

For example, if there are UEs supporting different set of numerologies only (e.g., UEs supporting 15 kHz only and UEs supporting 60 kHz only), one carrier may operate in different numerologies at the same time which can be operated in either TDM or FDM (or hybrid).

Figure 10:
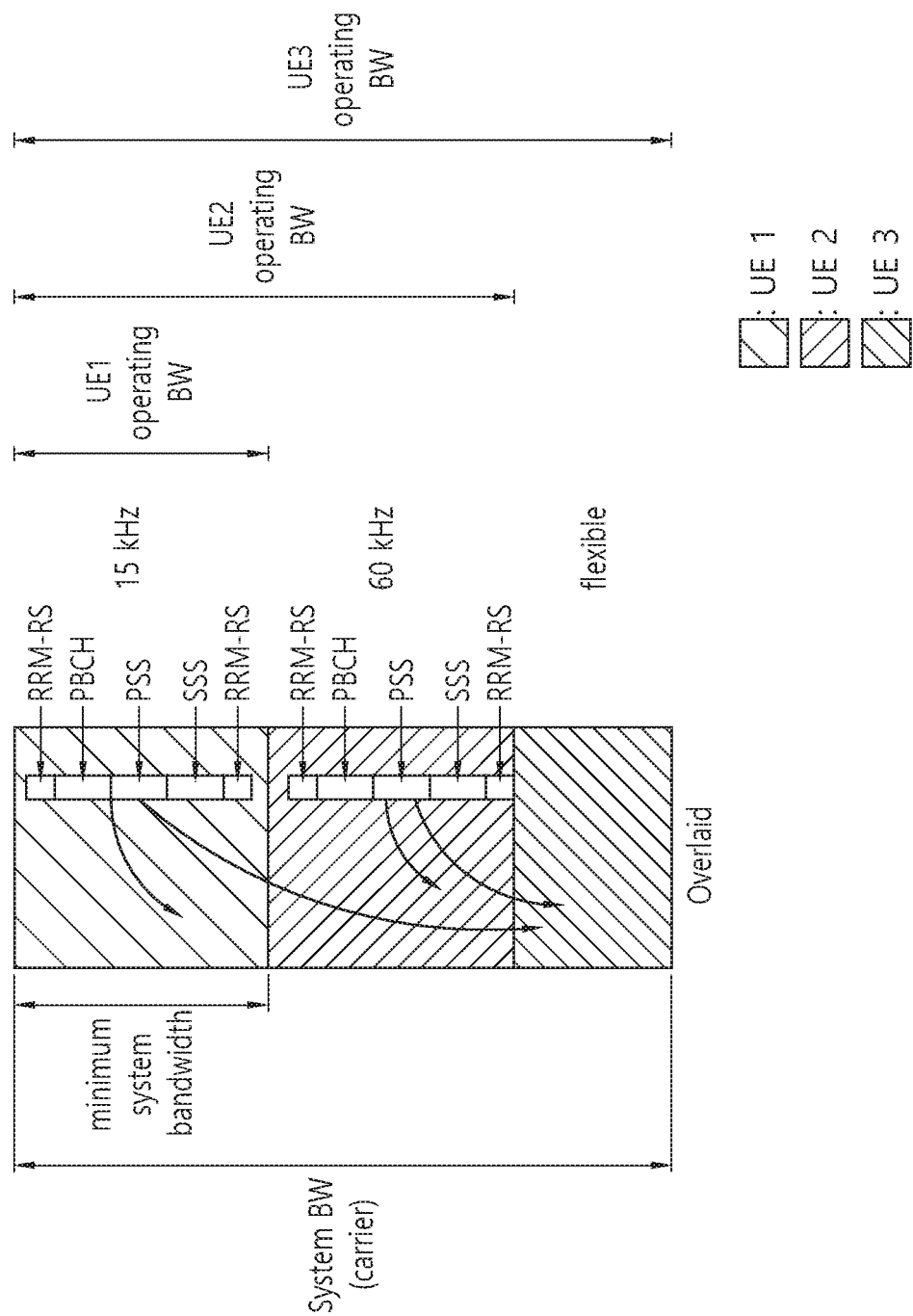
FIG. 10 shows UEs supporting different set of numerologies.

For example, as shown in FIG. 10, let's assume UEs with different numerology capabilities with potentially different operating system bandwidth (or bandwidth support capability) (UE1 with 15 kHz only, UE2 with 60 kHz only, and UE3 supporting both).

In this case, from the network perspective, unless there is a default numerology that a UE has to support (e.g., 15 kHz), synchronization signal may have to be transmitted in different numerology. Or, synchronization signals are transmitted with a default numerology and starting from PBCH, different numerology may be used. In case, different synchronization signals are used and/or PBCH is used per different numerology, the location of synchronization signals and/or PBCH needs to be shared between different numerologies either via FDM or TDM. Simple approach is to use different frequency location. In terms of operating frequency between different UEs can be overlapped or partitioned depending on the network deployment. In case a UE supporting both numerologies (e.g., UE3) may need to determine which numerology would be based on. From a UE supporting both numerologies, one carrier may be viewed as if two cells. In case, overlaid and potentially two different synchronization signals are transmitted, to avoid any confusion, different cell ID or TRP ID may be assumed between different numerologies. Alternatively, TRP ID can consists of TRP ID (detected by PSS/SSS, and additional information from PBCH, and others)+numerology (or frequency/time location) used for synchronization signal. Based on the initial synchronization signal's numerology, the corresponding initial access procedure numerology may be defined. If there is any signaling on the relationship between two synchronization signals with different numerologies (e.g., from the same TX antenna, QCL, etc), a UE may utilize both signals for cell detection and/or time/frequency tracking procedure.

Another example is to overlaid "SFN transmission" with normal transmission where initial access procedure may be achieved via SFN manner as well.

Another example is that depending on UE capability, minimum system bandwidth can be different in terms of RBs. For example, if a UE cannot support more than 5 MHz with any numerology, if 30 kHz subcarrier spacing is used, there would be only about 12 RBs (8 RB if one RB consists of 16 subcarriers) present, which may not be sufficient to accommodate PSS/SSS/PBCH/RRM-RS. In such a case, transmission of multiple signals over more than one OFDM symbol would be necessary, in which case, for example, PBCH/RRM-RS may be transmitted in the next OFDM symbol next to PSS/SSS instead of the same OS.

Depending on UE capability and assumption, it is possible that the network may transmit "duplicate" initial access related signals.

III. Channel Raster (or Sync Raster)

As mentioned above, it is desirable to align the initial synchronization with RB boundaries. As RB size in terms of bandwidth can be different depending on subcarrier spacing, general approach needs to be clarified. More specifically, the initial cell search in case of NR and LTE co-channel case needs to be clarified.

(1) Keep 100 kHz or multiple of 100 kHz as a channel raster (or Sync Raster): as NR carrier may not utilize null DC tone, NR carrier can have 7.5 kHz offset. In terms of cell search, thus, if the same channel raster is used, additional 7.5 kHz offset may be assumed for NR cell search (if the UE knows that it searches NR carrier).

(2) Use a channel raster as a function of RB size based on the given numerology or subcarrier spacing. For example, the channel raster with 15 kHz subcarrier spacing can be 180 kHz (if RB consists of 12 subcarriers) or 240 kHz (if RB consists of 16 subcarriers). With scaled subcarrier spacing, channel raster can increase by 180*m or 240*m where $SCm=2^m*15$ with the given subcarrier spacing SCm. In this case, the channel raster may be applied A. Within the band spectrum, including guard period, RB grid is formed from the lowest frequency to the highest frequency (or from the highest to the lowest, or from the center to edge) based on the given subcarrier spacing. Channel raster starts from the lowest frequency frequency (or from the highest or from the center towards edge) of the band. If guard band is known/prefixed, a few channel raster steps in guard band can be omitted.

B. Within the band spectrum, guard band is defined assuming the maximum system bandwidth which occupies the band, RB grid is formed within the system bandwidth from the lowest frequency to the highest frequency (or from the highest to the lowest, or from the center to edge) based on the given subcarrier spacing. Channel raster starts from the lowest frequency (or from the highest or from the center towards edge) of the band.

C. Within the band spectrum, a band is divided into a prefixed system bandwidth/carriers, and in each system bandwidth or carrier, RB grid is formed without considering guard band. The RB grid formation is similar to the above approaches.

It is noted that channel raster is aligned with RB boundaries.

In case this approach is used, if initial synchronization signals can be transmitted with more than one numerology or subcarrier spacing, different channel raster can be used for BD.

i. A subcarrier spacing with SCi of synchronization can be placed in every channel raster of $X*2^i$ where X is the bandwidth of one RB of 15 kHz subcarrier spacing (e.g., X=180 or 240).

When channel raster between SCi and SCi+1 collide, a UE may need to search both SCi and SCi+1 based synchronization signals.

For SCi based synchronization signal, it may be assumed that it can be placed only in $X*2^i$ which is not used for other subcarrier spacing channel raster (i.e., channel raster is odd number, or not overlap with other numerologies). By this way, supporting multiple numerologies at the initial synchronization signals can be supported without increasing BD. For example, if synchronization signals can be transmitted with 15 kHz, 30 kHz, and 60 kHz, the channel raster of each numerology/subcarrier spacing can be 180*i, 360*i, 720*i (or 240*i, 480*i, 960 i*) respectively. As it can be represented as X*i, X*2*i, X*4*i where X is the RB bandwidth based on the smallest bandwidth, a UE searches 15 kHz in X*1, X*3, X*5, (odd number of i) . . . and 30 kHz X*2*1, X*2*3, X*2*5, . . . (odd number of i), and 60 kHz in X*4*1, X*4*2, X*4*3, X*4*4, . . . (ever integer of i), and so on. Different set can be used for example, a band is divided into a few regions with fixed numerology in each region for synchronization signals which are either prefixed or configured by the network.

Figure 11:
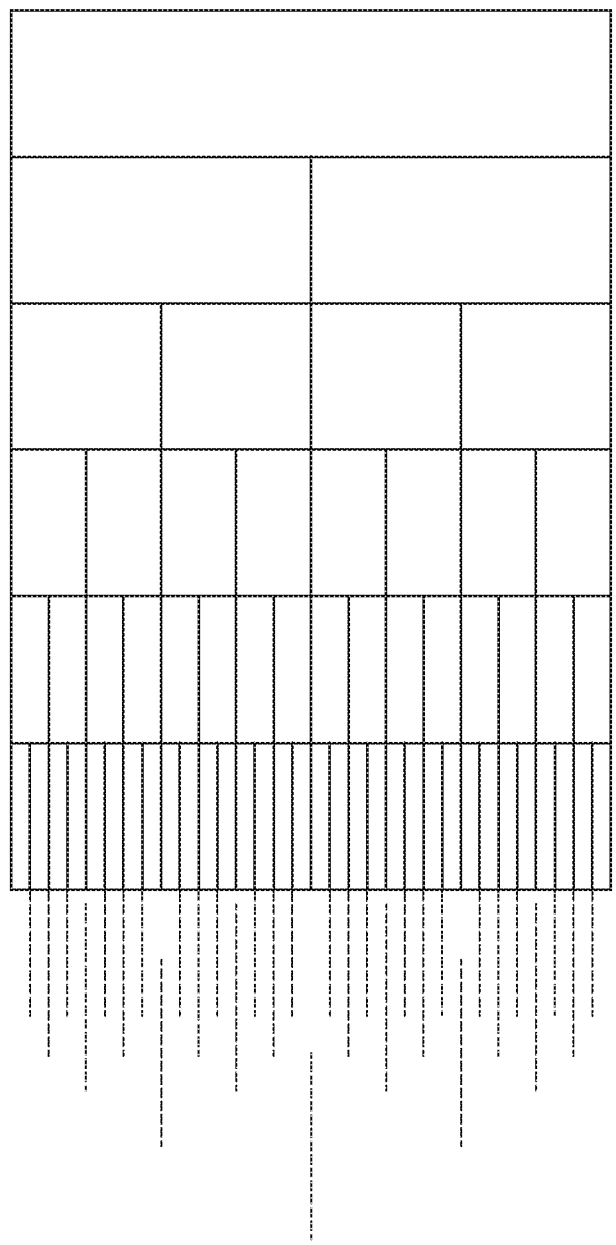
FIG. 11 shows possible candidate where each numerology can be used for synchronization signals.

FIG. 11 Shows Possible Candidate where Each Numerology can be Used for Synchronization Signals.

If there are 5 numerology/subcarrier spacing can be used for synchronization signal, the idea is to allow possible channel raster of the largest SC with largest SC for synchronization signals, and the non-overlapped position with the second largest SC with the largest SC can be used for the second largest SC numerology for synchronization signals, and so on. The remaining portions can be used for the smallest subcarrier spacing. More generally, if synchronization signals can be transmitted with SC0, SC0*2^m, X*2^m*i can be used with SC0*2^m, X*2^(m−1)*i which is not the same as X*2^m*j for any integer of i and j, can be used for SC0*2^m−1, X*2^(m−2)*i which is not the same as X*2^m*j or X*2^m−1*k for any integer of i, j, and k can be used for SC0*2^m−2, and so on. By this way, the maximum number of channel raster to search would be defined by the smallest subcarrier spacing, and it still can allow different subcarrier spacing values to be used for synchronization signals.

Another approach is to assume X*k*i+offset can be used for a subcarrier spacing where X is the RB size by the given subcarrier spacing, and k is the integer which may be defined by the largest subcarrier spacing with possible numerology usable for synchronization signals or fixed as a value or higher layer configured. The offset is used to partition the possible positions of synchronization signals with different numerologies for example, offset can be m*X (m=0, 1, 2, . . . , k−1).

It is noted that the start frequency location to initial channel raster can be defined per band (e.g., the lowest frequency of the band or highest frequency in the band or center frequency of the band) or per M MHz or a predefined bandwidth starting from 0, etc. The proposal/invention here refers channel raster value=0 which corresponds to the start frequency of the channel raster accordingly. In case, channel raster starts from the highest, X can be the highest frequency, and channel raster should be decreased. The main idea can be applied to such cases by extracting X*i for example (i.e., decrease in the frequency). In case channel raster starts from the center, it can increase and decrease from the center.

IV. Initial Access in Consideration of Potential Analog Beam (Stand-Alone)

Figure 12:
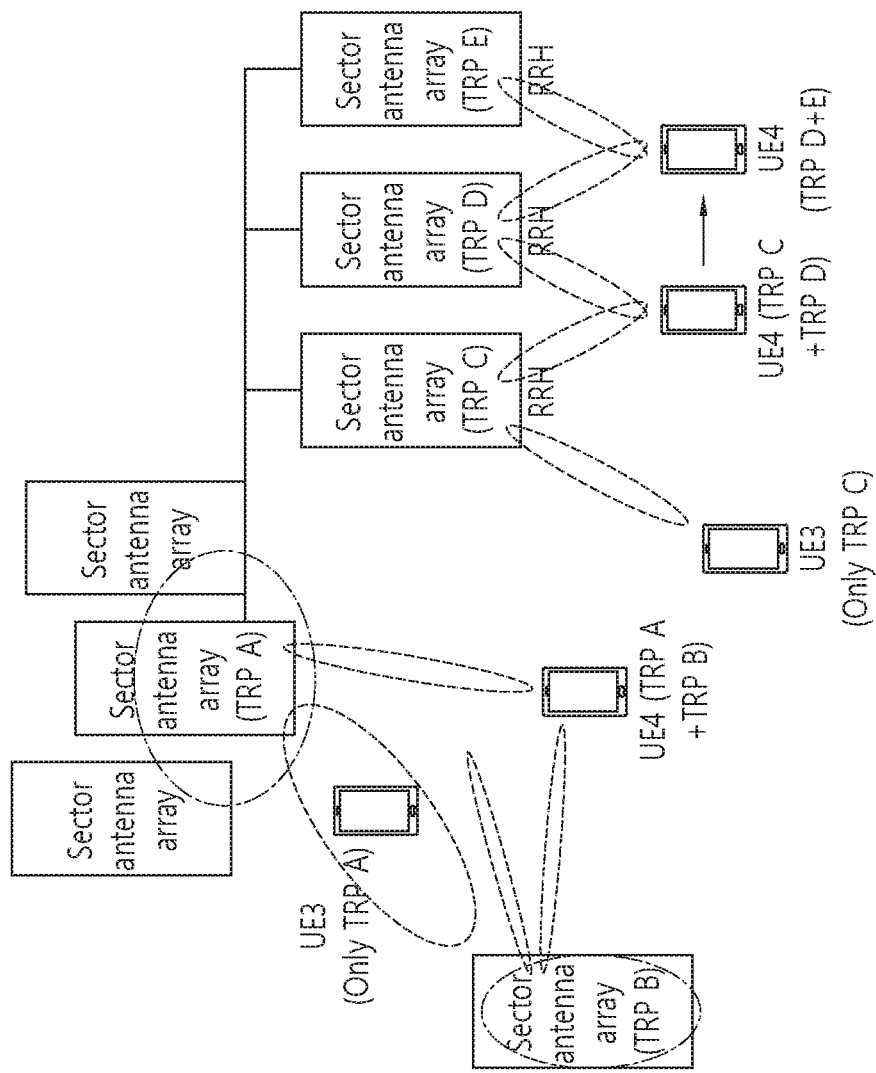
FIG. 12 shows an example of a spatial domain multiplexing among UEs

FIG. 12 Shows an Example of a Spatial Domain Multiplexing Among UEs

In new RAT, to allow different levels of hardware complexity, it is considered that spatial domain multiplexing among UEs including common data transmission and synchronization signals are considered. For example, multiple of synchronization signals can be transmitted over different time occasions which can cover different coverage in the network. For a convenience, we can call a beam which defines a coverage for synchronization signal as PSS-B, and SSS-B respectively. The number of beams that the network wants to support can be different based on deployment scenario, hardware capability, and etc. Generally, the following cases can be supported.

Figure 13:
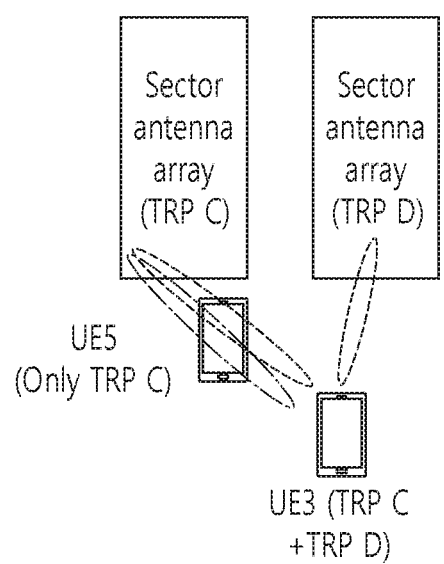
FIG. 13 shows exemplary beams of sector antenna arrays.

(1) A TRP (sector antenna array) supports a cell which could have multiple beams or single beam (2) A TRP (sector antenna array) supports more than one cells which can be overlapped in spatial domain: in this example, for example, two beams can be defined which can cover somewhat overlapped coverage where one beam is associated with cell ID A and the other beam is associated with cell ID B, and cell A may be operated in a CoMP/SFN operation with neighbour TRP. For example, as shown in FIG. 13, there could be two overlapped beams one supporting SFN between TRP C and TRP D and single transmission for TRP C. This approach would be more efficient in case SFN/CoMP operation should also support cell association differently from single cell transmission.

For a convenience, from the physical layer perspective, let's assume that cell ID is the identity which can be derived from synchronization signals (e.g., PSS-B, SSS-B).

When a UE searches PSS-B and SSS-B, there are different options in terms of "aggregation".

(1) One-shot detection: a UE cannot assume that any signals can be aggregated, thus, it detects and achieves time/frequency sync via one-shot detection of PSS-B/SSS-B. It is however assumed that the relationship between PSS-B and SSS-B exists such as the relative resource location of two is fixed.

(2) A UE can assume possible aggregation over signals based on a certain rule. One example is that PSS-B transmitted in a period can be aggregated where coherent combining capability may not be still assumed.

A. The rule can be different, for example, the period can be indicated by the assisting cell or by a predefined pattern based on ID or rule can be signalled by the assisting cell.

(3) A UE can assume possible aggregation over signals between signals transmitted next to each other. For example, if PSS-B1 and PSS-B2 are transmitted in OFDM symbol 1 and 2, a UE may safely assume that at least PSS-B1/PSS-B2 can be accumulated where there is no guarantee that PSS-B2 would be transmitted or PSS-B1 would be transmitted. Thus, the accumulation may be based on UE detection on energy and other criteria. For example, if a TRP supports more than one cells or beams may be transmitted from different transmission points, this may not be assumed. Thus, it may be further considered that this type of operation can be assumed only when a UE is indicated so. In other words, some long term property (e.g., time/frequency synchronization/offset within a boundary among multiple beams)

Figure 14:
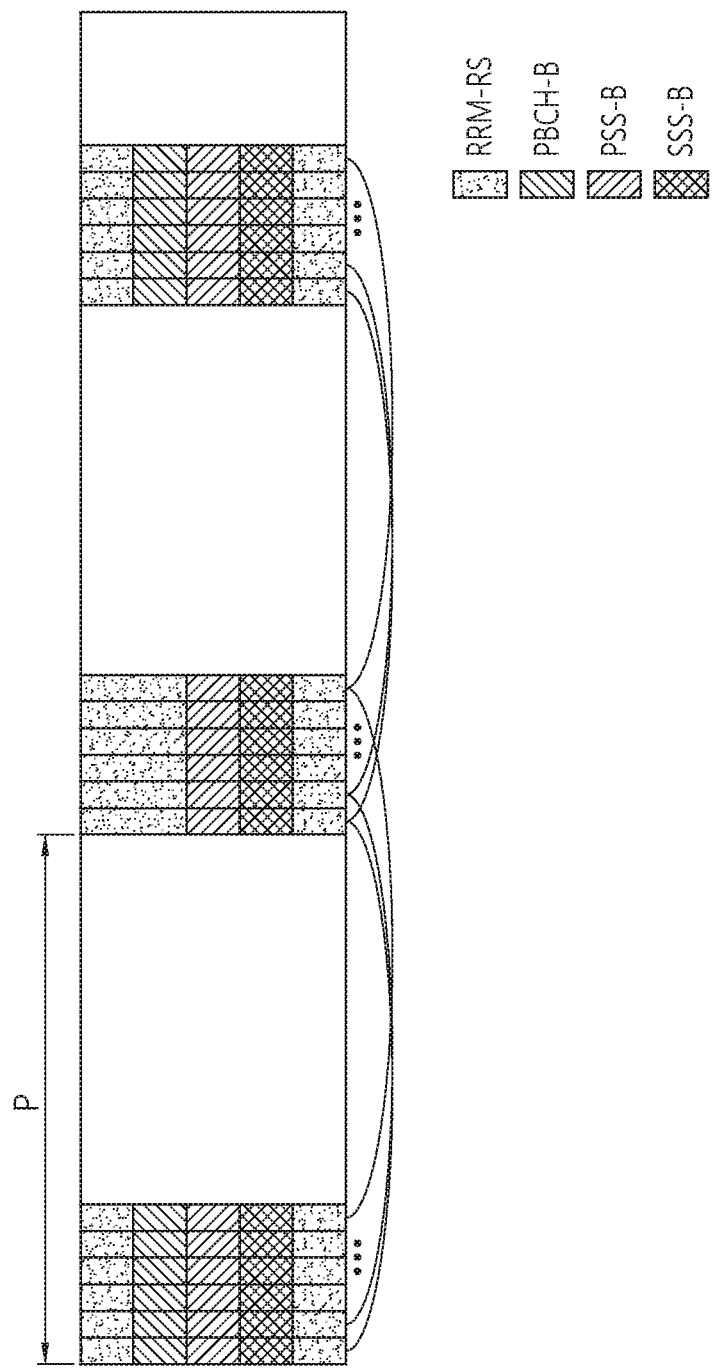
FIG. 14 shows UE behavior in terms of PSS-B/SSS-B accumulation.

Thus, unless otherwise indicated, basic/default UE behaviour in terms of PSS-B/SSS-B accumulation can be as shown in FIG. 14.

Now, let's call cell ID discovered by PSS-B/SSS-B as CID.

IV-1. Measurement Process

A measurement process is discussed.

Let's assume that a UE detects N CIDs, some of PSS-B/SSS-B are transmitted in the same time/frequency resource, and some are transmitted in different time/frequency resources.

For each CIDi, let exemplary's define center frequency fi, and time in P as ti. Unless otherwise indicated, a UE assumes that two different cells are discovered between fi=f ti=t and fj=f and tj=t+1OS. For each CIDi, RRM-RS is measured and RSRP is performed based on "port 0". It may be assumed that if a UE can detect other port(s) reliably, other ports can be also used for RSRP measurement. Based on RSRP, a UE selects the best cell, which can be one of the followings.

A TRP with a beam among multiple beams sharing the same cell ID (in case a UE switches beam, beam switching is rather used)

A TRP with a single beam

SFN or CoMP operation with a beam

In RRM-RS scrambling, CIDi detected by PSS-B/SSS-B is used. In terms of RRM-RS transmission, it is also necessary to define some rules which can be aggregated by a UE.

A UE can assume RRM-RSs transmitted in the same OS (orthogonal symbol) to PSS-B/SSS-B can be aggregated. For example, as shown in FIG. 14, RRM-RS in the same OS to PSS-B/SSS-B can be accumulated. This assumption may only apply in case a UE does not have any other information. In other words, at minimum, RRM-RS is assumed to be transmitted in the same periodicity and in the same time resource to PSS-B/SSS-B. For serving cell measurement on beam, additional RRM-RS can be transmitted which can be the same RS with different periodicity or may be different RS. At this the minimum RRM-RS can be used for neighbor cell measurements (i.e., before serving cell is identified for the given frequency). In terms of frequency resource of RRM-RS for this purpose may be confined to the minimum system bandwidth a UE can assume without any assistance information (or signalled as minimum system bandwidth by signaling). This procedure is called $1^{st}$ tier RRM measurement for the convenience. In terms of time/frequency tracking for this purpose, further options can be considered.

i. Alt1: time/frequency synchronization obtained only from PSS-B/SSS-B with the same beam (same beam may be defined by the resource relationship between PSS-B/SSS-B and RRM-RS-B, for example, as mentioned here, the same OFDM symbol is assumed to be carrying transmission from the same beam direction though the port(s) used in each signal or each RE may be different, and may not have any assumption, though QCL between synchronization signal and RRM-RS may be assumed over the same OFDM symbol or by implicit resource relationship between them, and also over the period if they are assumed to be transmitted periodically). In this approach, QCL relationship may be defined for Doppler shift and average delay between RRM-RS-B and PSS-B/SSS-B transmitted in the same OS (including periodic transmission). The QCL relationship between RRM-RS-B1 and PSS-B2/SSS-B2 which are transmitted in different OFDM symbol without any relationship of periodicity for RRM accumulation purpose are not assumed any relationship regarding the channel property including Doppler shift and average delay.

ii. Alt2: similar to Alt1, QCL relationship between PSS-B/SSS-B and RRM-RS-B are assumed. Regarding RRM-RS-B1 and PSS-B2/SSS-B2, instead of no assumption, it may be also assumed that QCL regarding to average delay. In this sense, some timing information obtained by other PSS-B2/SSS-B2 may be used for estimating/detecting PSS-B1/SSS-B1 and RRM-RS-B1. As it may be also possible that some of beams are SFN-ed transmission and some of beams are single-point transmission, the QCL among different signals may be assumed only when cell ID is the same. In other words, a UE cannot assume any relationship between signals with different cell ID scrambled.

If additional information is given about additional RRM-RS or time/frequency resource for RRM-RS, a UE can perform RRM based on the configuration. One example of additional RRM-RS is RRM-RS used for performing "best beam selection" procedure. RS for $2^{nd}$ tier may be a superset of RS of $1^{st}$ tier. This procedure is called $2^{nd}$ tier RRM measurement or best beam selection procedure for the convenience.

Whether a UE needs to support $2^{nd}$ tier measurement or best beam selection may be configurable by higher layer configuration, or determined by the frequency band or always performed or dynamically indicated.

In case RRM-RS measurement, overall the following approaches can be considered.

RRM measurement is always initiated with cell ID detection by reading PSS-B/SSS-B: in this case, RRM-RS which is assumed to be transmitted from the same beam/TRP(s) can be accumulated. Similar rule to assume the aggregation for PSS-B/SSS-B can be considered.

RRM measurement on RRM-RS based on a predefined rule or by configuration/assistance can be aggregated and performed. RRM-RS which may be present but not detected by PSS-B/SSS-B can be omitted for RRM measurement.

$1^{st}$ tier RRM is assumed to be performed rather periodically for serving and neighbor cells. It is noted that different procedure may be used even in $1^{st}$ tier RRM depending on whether a UE is in RRC_CONNECTED or RRC_IDLE (or equivalent state).

For $2^{nd}$ tier RRM measurement, or best beam selection, a UE may searches RRM-RS associated with PSS-B/SSS-B which are detected by cell ID detection only In other words, when $2^{nd}$ tier RRM is performed for best beam selection, unless otherwise indicated, cell ID detection is not assumed, thus, RRM-RS which are transmitted with beams not detected by the UE via cell ID detection procedure or synchronization procedure would not be used for the measurement. In other words, $2^{nd}$ tier RRM measurement is performed among CIDs (i.e., N CIDs from PSS-B/SSS-B detection from $1^{st}$ tier RRM) which has the same cell ID to the serving cell. This implies that different beams from the same TRP or with the same cell ID would be searched and reported. The number of "beams" need to be searched can be configured. For example, if '1' is configured, a UE performs $2^{nd}$ tier RRM measurement only on the best beam detected from cell ID detection/synchronization. If 'm' is configured, a UE performs $2^{nd}$ tier RRM measurement only on the best 'm' beams detected from cell ID detection/synchronization. Depending $1^{st}$ tier RRM measurement, the set of 'm' beams can be changed. Thus, when $2^{nd}$ tier RRM is reported, the beam ID may be also reported.

Alternatively, for $2^{nd}$ tier RRM, a UE may be requested to perform cell ID detection procedure again to discover any new beam(s) with good quality. This is important at least for the case of beam hand-over or switching procedure support in case of UE mobility. This procedure may be triggered by the network or by the UE depending on the quality of already detected beams/cell IDs. One example is to use "offset" or "threshold" to trigger cell ID detection procedure to discover potentially new beams for beam-selection procedure. Assuming $1^{st}$ tier RRM is performed periodically, this triggering may not be so essential. However, based on the threshold, $1^{st}$ tier RRM can be triggered. In that case, $1^{st}$ tier RRM may be performed only on the serving cell beams (i.e., with the same cell IDs) and the number of beams can be higher layer configured to minimize UE burden.

Figure 15:
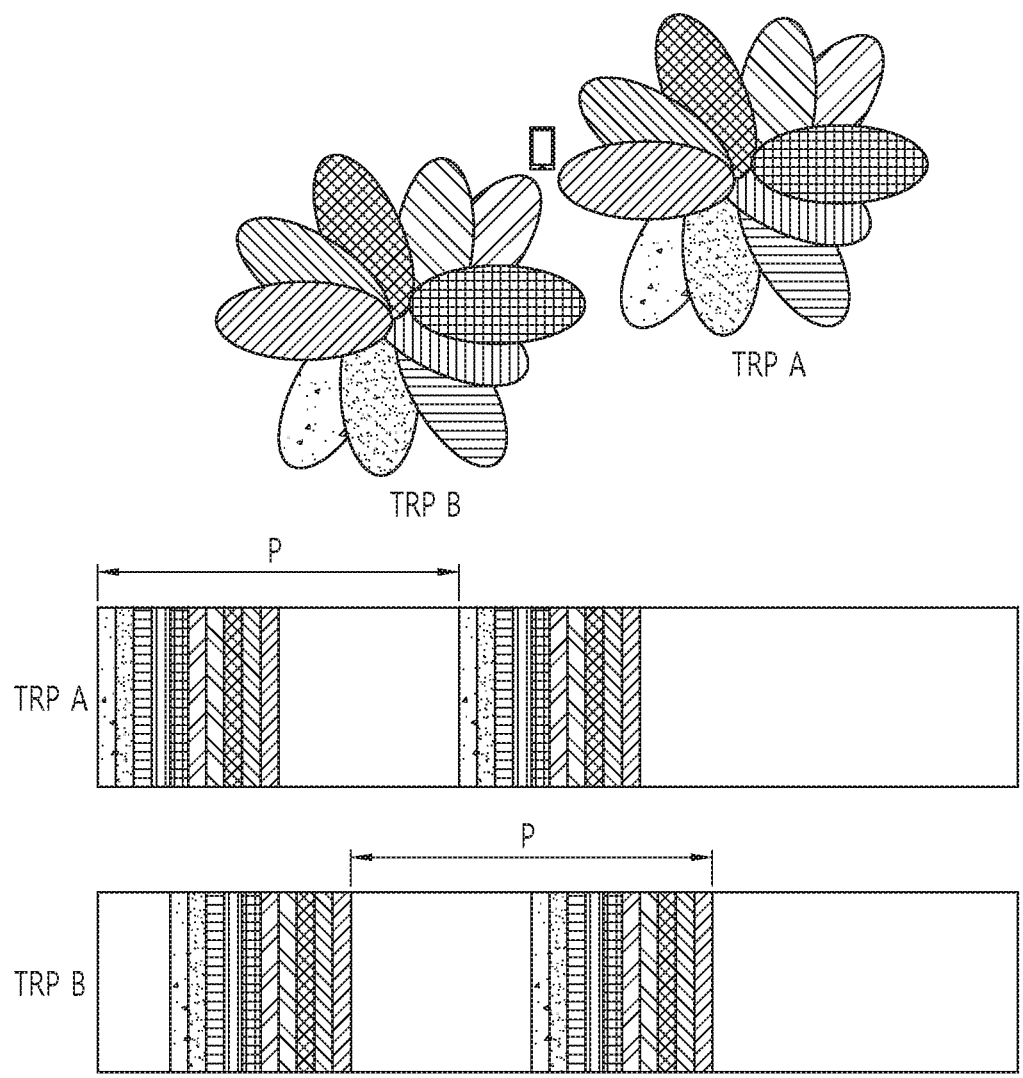
FIG. 15 shows an example of plural beams supported by each TRP.

FIG. 15 Shows an Example of Plural Beams Supported by Each TRP.

As shown FIG. 15, let's assume that there are 10 beams from each TRP, and one beam (in blue) is SFN-ed from two TRPs. Let's assume CID used for TRP A is CID-A, and CID used for TRP B is CID-B and SFN-ed beam's cell ID CID-C. With this assumption, a UE may detect (CID-A, 1) (CID-B, 5), (CID-C, 1) (assuming the beam ID is increased linearly from the beginning of sync signal transmission). If serving cell is CID-A, a UE performs beam-selection procedure only one the beam ID '1' (red beam).

In terms of number of a set of CID, beam IDs, it may be restricted to search at least 'M' pairs. It is noted that in case SFN transmission is used, extended CP may be used for PSS-B/SSS-B transmission. To align OFDM symbol boundary, in that case, it may be assumed that one signal is transmitted over 2 OS or the next PSS-B/SSS-B with normal CP is transmitted in the second OS.

Figure 16:
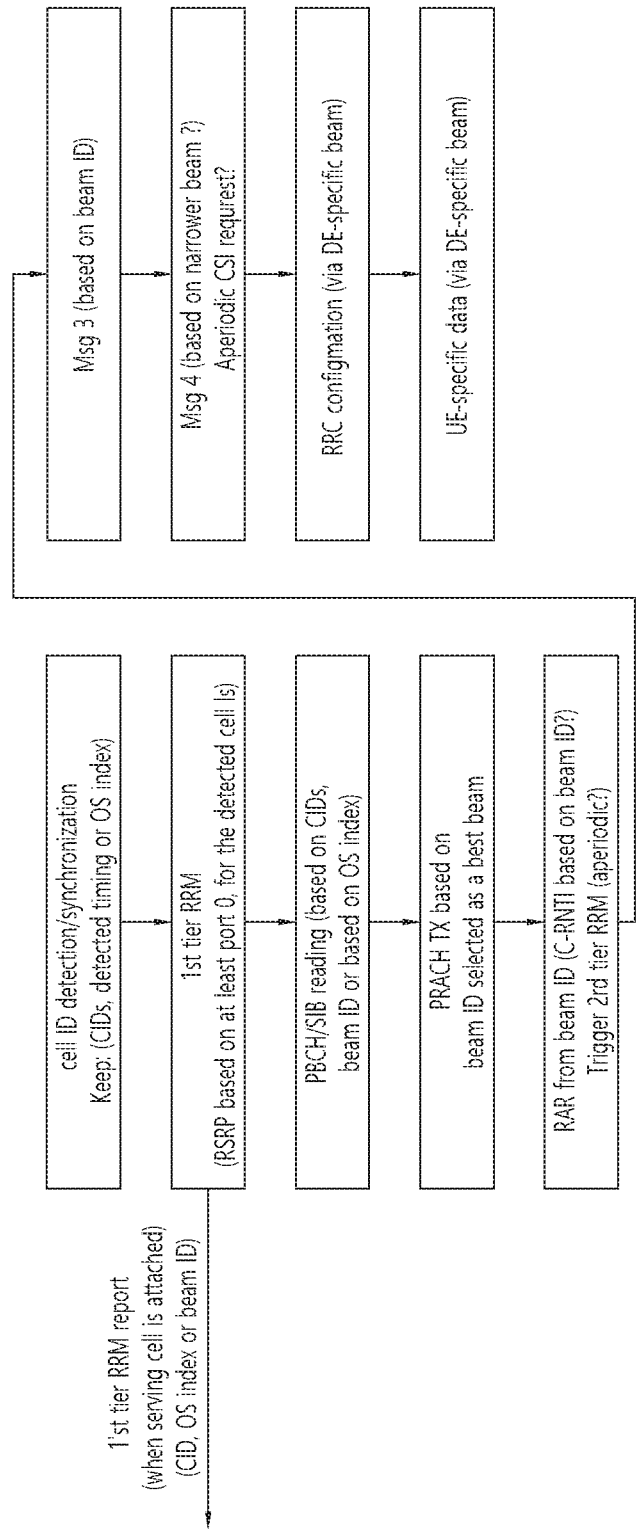
FIG. 16 shows an exemplary procedure for initial access in stand-alone.

The above-explained procedure for initial access in stand-alone is summarized as shown in FIG. 16.

iv-2. PBCH Reading and the Associated SIB

Hereinafter, PBCH reading and the associated SIB is discussed.

To detect proper msg3 on the transmitted PRACH based on beam ID, when determining RA-RNTI (or equivalent RNTI), beam ID should be considered.

Also, to support beam forming, best beam selection or beam report may be triggered in RAR message along with beamRS transmission in RAR message transmission duration. In Msg4, to assist UE-specific beam forming quickly, aperiodic CSI can be triggered.

During the initial access procedure until UE-specific ID is given, cell ID (and/or beam ID) is assumed to be used.

When beam switching or handover is used, UE-specific ID may be still preserved to support UE-centric cell or transmission. During hand-over, based on the UE-specific ID, data/control can be continuously transmitted.

IV-3. Location of Synchronization Signal

Considering alignment between different numerologies, it is expected that different CP may be used in different OFDM symbols. For example, the following indicates two different mechanisms of symbol level alignments.

Figure 17:
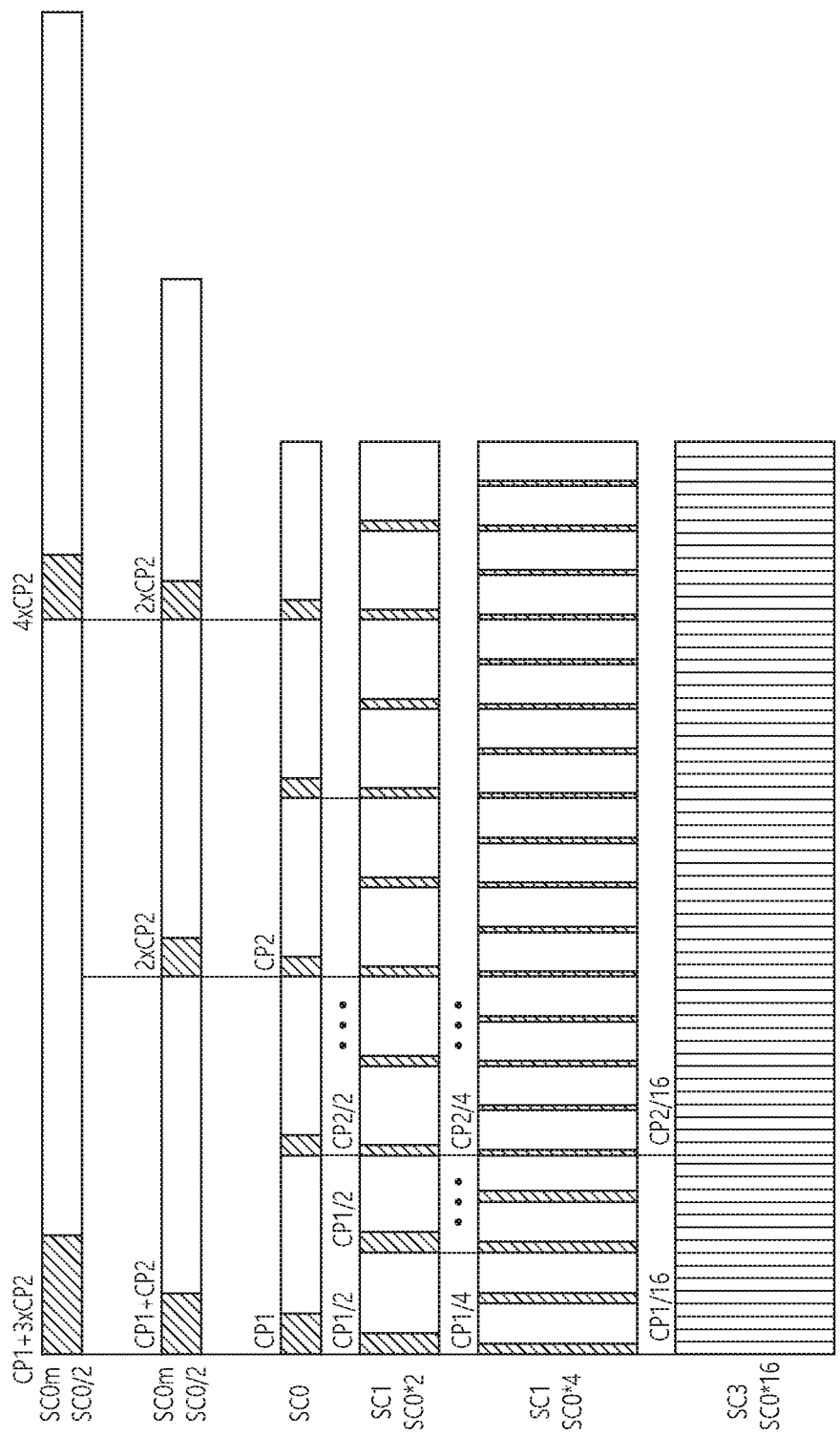
FIG. 17 shows an example of evenly distributed CPs.
Figure 18:
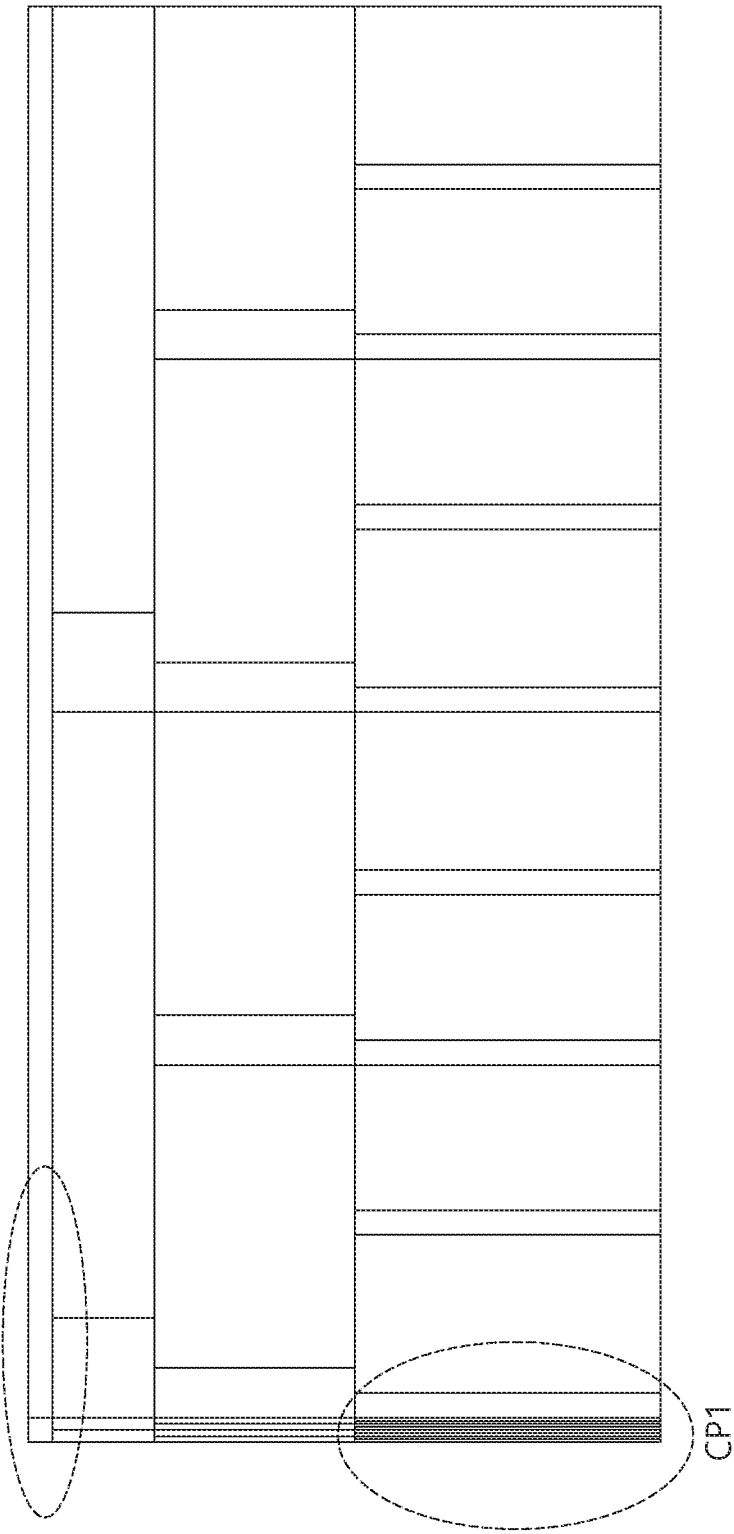
FIG. 18 shows Large first OS.
Figure 19:
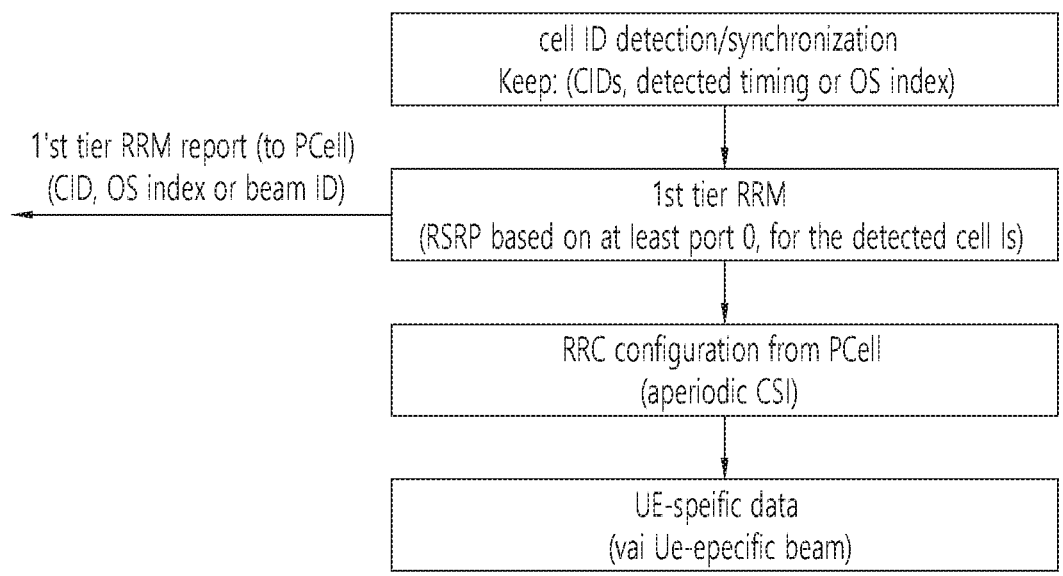
FIG. 19 shows an example of a UE procedure.

FIG. 17 Shows an Example of Evenly Distributed CPs. And, FIG. 18 Shows Large First OS.

With the first approach, depending on the subcarrier spacing, there could be different numbers of OFDM symbols which have different CP lengths compared to other OFDM symbols. To allow possibly aggregation over multiple synchronization signals, it could be necessary to know which CP length or which OFDM symbols are used for synchronization signals. There are a couple of mechanisms to handle the case as the follows.

(1) Synchronization signals are not placed in slot(s) which could have larger CP OFDM symbols compared to other OFDM symbols.

For example, if CP formation is based on 15 kHz as the base numerology, and PSS/SSS are placed with 30 kHz subcarrier spacing, it would not be placed in subframe i % 2=0 if subframe length is 7 OS. If subframe length is 14 OS, it means every subframe. In case of 60 kHz, subframe i % 2=0 (if subframe consists of 14 OS) or subframe i % 4=0 (if subframe consists of 7 OS) can be excluded for synchronization signal position.

(2) Synchronization signals are not placed in OFDM symbols with larger CP than other OFDM symbols.

To avoid any ambiguity in terms of time difference between two OFDM symbols, one approach is not to place synchronization signals in the OFDM symbol with larger CP except for the first OFDM symbol. For example, with 30 kHz subcarrier spacing with 15 kHz base numerology, synchronization signal can not be placed in the first OFDM symbol in every slot/subframe (if slot/subframe consists of 14 OS) or every other slot/subframe (if subframe consists of 7 OS), and with 60 kHz, $1^{st}$, $2^{nd}$, $3^{rd}$ OFDM symbol in subframe where subframe index % 2=0 (if subframe consists of 14 OS) or subframe index % 4=0 (if subframe consists of 7 OS). It is noted that the first OFDM symbol with larger CP may be used for synchronization signal(s) transmission. The motivation is to maintain the same gap between two OFDM symbols carrying synchronization signal(s).

(3) Always assume that subframe or slot consists of larger CP OFDM symbol with remaining smaller CP OFDM symbols (in other words, the gap between two OFDM symbols in a subframe is always same)

(4) Allow UE BD if synchronization signal is not restricted, a UE needs to perform blind detection on CP length between OFDM symbols (5) No aggregation allowed over OFDM symbols (no specification support is assumed for this)

Note that the same principle can be applied for SS block where PSS/SSS/PBCH are transmitted in TDM manner. In other words, to avoid any ambiguity between PSS/SSS or SSS/PBCH, SS block may not be placed in the OFDM symbol with larger CP compared to other OFDM symbols or only PSS may be placed in the OFDM symbol with larger CP whereas SSS/PBCH are not placed in the OFDM symbol(s) with larger CP. For example, with 15 kHz subcarrier spacing with NCP, PSS/SSS/PBCH (or SS block) can be placed in OFDM symbols 2-7 in every 0.5 msec, or only PSS can be placed in the first OFDM symbol in every 0.5 msec. As after reading PSS, a UE may not know which OFDM symbol where PSS has been mapped. Thus, ambiguity of timing gap between PSS/SSS, and also between SSS/PBCH would be same issue to the issue mentioned in above.

Either a UE performs blind decoding, or does not allow aggregation over different OFDM symbols such that any assumption of CP length between two OFDM symbol is not assumed. In other words, any CP length between two OFDM symbols can be possible in this case, and synchronization signals can be placed in any OFDM symbols.

The similar issue exists even in case of 15 kHz where larger CP OS is placed in every 7OS. Between synchronization signal placed in OS #6 and OS #7, the CP length difference becomes larger than the gap between other OFDM symbols. Thus, it may be assumed that more than 7OS are used for synchronization signals with 15 kHz, or if this is used, it may be based on UE blind detection in every OFDM symbol as the UE may not know which OFDM symbol it detects synchronization signals. Alternatively, synchronization signal may not be mapped to the first OFDM symbol of second slot such that the gap between two OFDM symbols carrying synchronization signal is constant (there could be two values if normal CP and extended CP are distinguished by synchronization signals). In case the base numerology is non-15 kHz, to allow more OFDM symbols with the consistent gap, it can be considered to utilize the frame structure or numerology assumed that the default numerology is 15 kHz (and thus more than 12 with 30 kHz and 24 with 60 kHz can have the same gap value between symbols).

Thus, the invention proposes not to map at least SSS and PBCH in the OFDM symbols with larger CP.

V. Initial Access in Consideration of Potential Analog Beam (DC or CA) or New RAT Assisted by LTE Carrier In case dual connectivity or CA is used between LTE and NR cell, in terms of initial access on NR cell can be simplified as shown in the above. When a UE reports PCID & beam ID in the second step, based on the measurement, PCell/PCG can initiate the cell association procedure. To minimize unnecessary common signal transmission, either contention-free based RACH procedure is used or RACH-less operation can be considered based on the timing difference between PCell and SCell. Another approach is to assume that TA for NR cell is assumed to be fixed for example as zero.

When dual connectivity/CA is supported between LTE and NR carrier, assistance information can be delivered form LTE PCG. Potential assistance information can be as the follows.

the frequency and/or location where PSS-B/SSS-B for the given service/numerology numerology (SC spacing, CP length) information of PSS-B/SSS-B the interval/period of synchronization signal/measurement RS transmission the number of beams QCL relationship (or any relationship) between different PSS-B/SSS-B transmissions System bandwidth (where RRM-RS can be widely transmitted, and thus measurement accuracy can be improved)

Measurement restriction (any restriction in the measurements)

When LTE and NR are associated with dual connectivity, particularly NR is operating with analog beam, considering of performing RACH procedure via assisted LTE carrier can be considered. In the RACH procedure, mainly the following steps are considerable.

1st step: a UE is configured with the frequency/time location where PSS/SS of NR carrier(s) can be detected. There could be a list of candidates. The UE performs cell detection/measurement procedure based on the assisted information.

2nd step: the UE reports RRM measurement to the assisting carrier, where the necessary information such as the best beam(s), cell ID(s), RSRP, etc. The UE may report the best cell only or may report all results or results which exceed a certain threshold.

3rd step: the assisting cell forwards PRACH configuration information which is based on the best cell or all PRACH configurations. The access procedure to NR carrier can be based on non-contention based approach where dedicated PRACH resource can be indicated as well. Along with PRACH configuration, necessary information about control channel (e.g., search space, PRB sets, numerology, etc) is also indicated to the UE.

4th step: the UE performs RACH procedure based on the configuration.

The embodiments illustrated above may be implemented by various instruments. For example, the embodiments of the present invention may be implemented by hardware, firmware, software, or combinations thereof, which will be described in detail with reference to FIG. 9.

Figure 20:
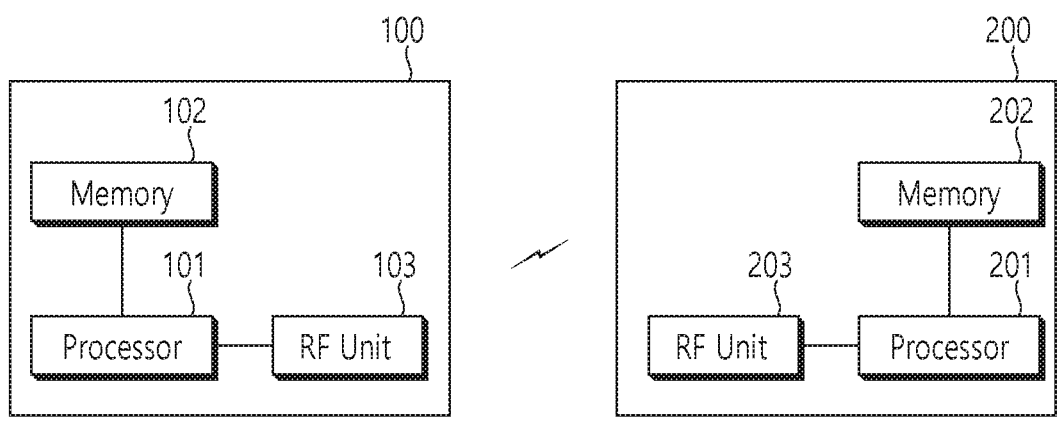
FIG. 20 is a block diagram illustrating a wireless communication system according to an embodiment of the present invention.

FIG. 20 is a Block Diagram Illustrating a Wireless Communication System According to an Embodiment of the Present Invention.

ABS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for receiving a synchronization signal (SS), the method performed by a user equipment (UE) and comprising:

receiving a block for the SS from a cell, wherein the block for the SS includes a primary synchronization signal (PSS), a secondary synchronization signal (SSS), and a physical broadcast channel (PBCH);

receiving radio resource management reference signals (RRM-RSs) from the cell and from a neighbor cell, respectively;

performing a measurement based on the block for the SS and the RRM-RSs, wherein the RRM-RSs includes a first RRM-RS and a second RRM-RS, and wherein the second RRM-RS is used to select a best beam of the cell;

transmitting a random access preamble based on a beam ID of the selected best beam;

receiving a random access response including a Radio Network Temporary Identifier (RNTI) based on the beam ID of the selected best beam; and transmitting a third message (MSG3) in response to the reception of the random access response, the MSG3 including the beam ID of the selected best beam, wherein the block for the SS is not aligned with a center frequency of a bandwidth of the cell, wherein the bandwidth of the cell is divided into a plurality of bandwidth parts (BWPs), and wherein the UE is configured with at least one BWP among the plurality of BWPs.

2. The method of claim 1,
wherein the plurality of BWPs are used for one or more numerologies, and
wherein each numerology is defined by a subcarrier spacing and a cycle prefix.

3. The method of claim 1, wherein a size of the at least one BWP is differently configured per UE.

4. The method of claim 1, wherein the block for the SS is received per beam.

5. The method of claim 4, further comprising:
performing a beam sweeping for receiving the block for the SS.

6. The method of claim 1, further comprising:
transmitting a beam measurement report including information regarding a best beam.

7. The method of claim 1, further comprising:
performing a random access procedure,
wherein the random access procedure relates to a procedure for managing a beam.

8. The method of claim 1, wherein the cell is a new radio (NR) cell, and
wherein a channel raster of the NR cell is shifted by 7.5 kHz.

9. A user equipment (UE) configured to receive a synchronization signal (SS), the UE comprising:
a transceiver;
at least one processor; and
at least one computer memory operably connectable to the at least one processor and storing instructions that, based on being executed by the at least one processor, perform operations comprising:
receiving, through the transceiver, a block for the SS from a cell, wherein the block for the SS includes a primary synchronization signal (PSS), a secondary synchronization signal (SSS), and a physical broadcast channel (PBCH);
receiving radio resource management reference signals (RRM-RSs) from the cell and from a neighbor cell, respectively;
performing a measurement based on the block for the SS and the RRM-RSs,
wherein the RRM-RSs includes a first RRM-RS and a second RRM-RS,
wherein the second RRM-RS is used to select a best beam of the cell;
transmitting a random access preamble based on a beam ID of the selected best beam;
receiving a random access response including a Radio Network Temporary Identifier (RNTI) based on the beam ID of the selected best beam; and
transmitting a third message (MSG3) in response to the reception of the random access response, the MSG3 including the beam ID of the selected best beam,
wherein the block for the SS is not aligned with a center frequency of a bandwidth of the cell,
wherein the bandwidth of the cell is divided into a plurality of bandwidth parts (BWPs), and
wherein the UE is configured with at least one BWP among the plurality of BWPs.

10. The UE of claim 9,
wherein the plurality of BWPs are used for one or more numerologies, and
wherein each numerology is defined by a subcarrier spacing and a cycle prefix.

11. The UE of claim 9, wherein a size of the at least one BWP is differently configured per UE.

12. The UE of claim 9, wherein the block for the SS is received per beam.

13. The UE of claim 9, wherein the operations further comprise:
performing a beam sweeping for receiving the block for the SS.

14. The UE of claim 9, wherein the operations further comprise:
transmitting, through the transceiver, a beam measurement report including information regarding a best beam.

15. The UE of claim 9, wherein the operations further comprise:
performing a random access procedure,
wherein the random access procedure relates to a procedure for managing a beam.

16. The UE of claim 9, wherein the cell is a new radio (NR) cell, and
wherein a channel raster of the NR cell is shifted by 7.5 kHz.

17. A processing device configured to control a user equipment (UE) to receive a synchronization signal (SS), the processing device comprising:
at least one processor; and
at least one computer memory operably connectable to the at least one processor and storing instructions that, based on being executed by the at least one processor, perform operations comprising:
receiving a block for the SS from a cell, wherein the block for the SS includes a primary synchronization signal (PSS), a secondary synchronization signal (SSS), and a physical broadcast channel (PBCH);
receiving radio resource management reference signals (RRM-RSs) from the cell and from a neighbor cell, respectively;
performing a measurement based on the block for the SS and the RRM-RSs,
wherein the RRM-RSs includes a first RRM-RS and a second RRM-RS,
wherein the second RRM-RS is used to select a best beam of the cell;
transmitting a random access preamble based on a beam ID of the selected best beam;
receiving a random access response including a Radio Network Temporary Identifier (RNTI) which is based on the beam ID of the selected best beam; and
transmitting a third message (MSG3) in response to the reception of the random access response, the MSG3 including the beam ID of the selected best beam,
wherein the block for the SS is not aligned with a center frequency of a bandwidth of the cell,
wherein the bandwidth of the cell is divided into a plurality of bandwidth parts (BWPs), and
wherein the UE is configured with at least one BWP among the plurality of BWPs.

18. The processing device of claim 17,
wherein the plurality of BWPs are used for one or more numerologies, and
wherein each numerology is defined by a subcarrier spacing and a cycle prefix.

19. The processing device of claim 17, wherein a size of the at least one BWP is differently configured per UE.

20. The processing device of claim 17, wherein the block for the SS is received per beam.

\* \* \* \* \*